(12) United States Patent
Sprigg et al.

(10) Patent No.: US 8,937,930 B2
(45) Date of Patent: Jan. 20, 2015

(54) VIRTUAL PERIPHERAL HUB DEVICE AND SYSTEM

(75) Inventors: Stephen A. Sprigg, Poway, CA (US); Noam A. Ziv, San Diego, CA (US); Craig B. Lauer, La Jolla, CA (US); Kedarnath Pathikonda, Andhra Pradesh (IN); Richard W. Gardner, III, Rancho Santa Fe, CA (US)

(73) Assignee: QUALCOMM, Incorporated, San Diego, CA (US)

(*) Notice: Subject to any disclaimer, the term of this patent is extended or adjusted under 35 U.S.C. 154(b) by 272 days.

(21) Appl. No.: 12/948,739

(22) Filed: Nov. 17, 2010

(65) Prior Publication Data

US 2011/0205965 A1  Aug. 25, 2011

Related U.S. Application Data

(60) Provisional application No. 61/262,653, filed on Nov. 19, 2009.

(51) Int. Cl.
*H04Q 7/24* (2006.01)
*G06F 9/44* (2006.01)

(52) U.S. Cl.
CPC ....... *G06F 9/4411* (2013.01); *H04L 2212/0025* (2013.01)
USPC .......................................... 370/338; 709/204

(58) Field of Classification Search
CPC ................................................. H04W 76/021
USPC .......................... 370/338; 340/12.23; 709/204
See application file for complete search history.

(56) References Cited

U.S. PATENT DOCUMENTS 6,239,716 B1  5/2001  Pross et al.
6,301,484 B1  10/2001  Rogers et al.
(Continued)

FOREIGN PATENT DOCUMENTS

CN  1976310 A  6/2007
EP  1411751 A2  4/2004
(Continued)

OTHER PUBLICATIONS

Ant, http://www.thisisant.com/.
(Continued)

*Primary Examiner* — Wanda Z Russell
(74) *Attorney, Agent, or Firm* — Shirin Tefagh

(57) ABSTRACT

Methods and devices provide a virtual peripheral hub and services enabling remote access to peripherals commonly connected to personal computers in a manner that simplifies device networking. A virtual peripheral hub device may include a processor and wireless communication transceivers configured to connect to cellular and/or WiFi networks to access a remote server, and wired and/or wireless local networks for connecting to peripheral devices. The virtual peripheral hub device may plug into a power source (e.g., a wall socket or cigarette lighter), connect to a peripheral device, and be configured to enable any computer attached to a local area network or the Internet to use or access the peripheral device. An associated server-based service enables discovery of the virtual peripheral hub device and connected peripherals. The associated server-based server may provide the drivers for various peripherals, store and forward data, and provide remote access to the various peripherals.

86 Claims, 25 Drawing Sheets

(56) References Cited

U.S. PATENT DOCUMENTS

| | | | |
|---|---|---|---|
| 6,396,466 | B1 | 5/2002 | Pross et al. |
| 6,418,535 | B1* | 7/2002 | Kulakowski et al. ......... 713/320 |
| 7,136,672 | B2 | 11/2006 | Kitano et al. |
| 7,164,907 | B2 | 1/2007 | Cochran et al. |
| 7,391,406 | B2 | 6/2008 | Yamamoto et al. |
| 7,618,345 | B2 | 11/2009 | Corbalis et al. |
| 7,761,261 | B2 | 7/2010 | Shmueli et al. |
| 8,213,971 | B2 | 7/2012 | Papineau et al. |
| 8,364,857 | B2 | 1/2013 | Pyers et al. |
| 2004/0064453 | A1* | 4/2004 | Ruiz et al. .......................... 707/9 |
| 2004/0073411 | A1 | 4/2004 | Alston et al. |
| 2004/0088180 | A1* | 5/2004 | Akins, III .......................... 705/1 |
| 2004/0125813 | A1 | 7/2004 | Tanaka et al. |
| 2005/0097191 | A1* | 5/2005 | Yamaki et al. ................. 709/219 |
| 2005/0248944 | A1 | 11/2005 | Sloan |
| 2005/0269580 | A1 | 12/2005 | D'angelo |
| 2006/0089542 | A1 | 4/2006 | Sands |
| 2007/0005867 | A1 | 1/2007 | Diamant |
| 2007/0011374 | A1 | 1/2007 | Kumar |
| 2008/0097908 | A1 | 4/2008 | Dicks et al. |
| 2010/0017471 | A1* | 1/2010 | Brown et al. ................. 709/204 |
| 2010/0049885 | A1* | 2/2010 | Chandra et al. ................. 710/36 |
| 2010/0211967 | A1* | 8/2010 | Ramaswamy et al. .......... 725/14 |
| 2010/0269157 | A1* | 10/2010 | Experton ........................... 726/4 |
| 2010/0300856 | A1 | 12/2010 | Pance et al. |
| 2010/0315021 | A1 | 12/2010 | Lau et al. |
| 2011/0109444 | A1* | 5/2011 | Edwards et al. ........... 340/12.23 |
| 2011/0234409 | A1 | 9/2011 | Soliman |
| 2012/0182939 | A1 | 7/2012 | Rajan et al. |
| 2013/0162160 | A1 | 6/2013 | Ganton et al. |

FOREIGN PATENT DOCUMENTS

| | | |
|---|---|---|
| EP | 1659830 A1 | 5/2006 |
| EP | 1753180 A1 | 2/2007 |
| EP | 1753190 A1 | 2/2007 |
| EP | 1887756 A2 | 2/2008 |
| EP | 2209353 A2 | 7/2010 |
| JP | 2002123493 A | 4/2002 |
| JP | 2002125062 A | 4/2002 |
| JP | 2003196128 A | 7/2003 |
| JP | 2004208101 A | 7/2004 |
| JP | 2004304623 A | 10/2004 |
| JP | 2006005789 A | 1/2006 |
| JP | 2006203306 A | 8/2006 |
| JP | 2007526676 A | 9/2007 |
| JP | 2007281904 A | 10/2007 |
| JP | 2007528618 A | 10/2007 |
| JP | 2007334581 A | 12/2007 |
| WO | WO-0117297 | 3/2001 |
| WO | 0227640 A2 | 4/2002 |
| WO | WO-2005048629 A1 | 5/2005 |
| WO | 2008052293 A1 | 5/2008 |
| WO | WO-2009032134 A2 | 3/2009 |
| WO | 2010038918 A1 | 4/2010 |

OTHER PUBLICATIONS

Braden, "Requirements for Internet Hosts—Communication Layers," Newwork Working Group, Internet Engineering Task Force, Request for Comment: 1122, pp. 1-117, Oct. 1989.

Chen, et al., "A Smart Gateway for Health Care System Using Wireless Sensor Network." IEEE, 2010 Fourth International Conference on Sensor Technologies and Applications (SENSORCOMM), pp. 545-550, Jul. 18-25, 2010.

Continua Certification Version 1.0, Continua Health Alliance, Feb. 23, 2009, http://www.continuaalliance.org/static/cms_workspace/Continua_Certification_Public.pdf.

Continua Health Alliance Certification Process, http://www.continuaalliance.org/products/cert-process.html.

Continua Health Alliance, http://www.continuaalliance.org/index.html.

Fernando T N C et al., "Ethernet frame tunneling over GPRS/EDGE for universal network monitoring", Industrial and Information Systems (ICIIS), 2009 International Conference on, IEEE, Piscataway, NJ, USA, Dec. 28, 2009, pp. 55-61, XP031647988, ISBN: 978-1-4244-4836-4.

Hirofuchi T et al, "USB/IP—a Peripheral Bus Extension for Device Sharing over IP Network", Proceedings of the USENIX Annual Technical Conference, XX, XX, Jan. 1, 2005, pp. 47-60, XP007901448.

http://www.wi-fi.org/ Wireless Standars 802.11.

International Search Report and Written Opinion—PCT/US2010/057522, ISA/EPO—Apr. 27, 2011.

Jerger, et al., "Memoirs of an eHealth Device Development," 2011 IEEE 13th International Conference on e-Health Networking, Applications and Services, pp. 332-337, 2011.

Mitchell, "Wireless Standards—802.11b 802.11a 802.11g and 802.11n, the 802.11 Family explained," About.com Guide, http://compnetworking.about.com/cs/wireless80211/a/aa80211standard.htm.

OLTP vs. OLAP, Datawarehouse, http://datawarehouse4u.info/OLTP-vs-OLAP.html.

Part 11: Wireless LAN Medium Access Control (MAC) and Physical Layer (PHY) Specifications, ANSI/IEEE STD 802.11, XX, XX, Jun. 12, 2003, pp. 34-88, XP002382009.

Wikipedia, IEEE, Wireless Standards 802.11, http://compnetworking.about.com/cs/wireless80211/a/aa80211standard.htm.

Wikipedia, "Online Analytical Processing," http://en.wikipedia.org/wiki/Online_analytical_processing.

Continua Health Alliance, Apr. 15, 2014, 3 pages, http://www.continuaalliance.org/index.html.

Continua Health Alliance Certification Process, Apr. 14, 2014, 5 pages, http://www.continuaalliance.org/products/cert-process.html.

Datawarehouse, "OLTP vs. OLAP," Mar. 24, 2014, Retrieved from the Internet < URL: http://datawarehouse4u.info/OLTP-vs-OLAP.html >, 2 pages.

Mitchell B., "Wireless Standards—802.11a, 802.11b/g/n, and 802.11ac, the 802.11 Family explained," Apr. 14, 2014, 2 pages, About.com Guide, http://compnetworking.about.com/cs/wireless80211/a/aa80211standard.html.

Vicente K.S., "ANT Wireless. Go Beyond," Apr. 15, 2014, 2 pages, http://www.thisisant.com.

Wi-Fi Alliance, "Who We Are," Apr. 15, 2014, 2 pages, http://www.wi-fi-org/Wireless Standards 802.11.

Wikipedia, "IEEE 802.11," Wireless Standards 802.11, Apr. 13, 2014, 15 pages, http://compnetworking.about.com/cs/wireless802.11a/aa80211 standard.html.

Wikipedia, "Online Analytical Processing," Mar. 24, 2014, 7 pages, http:///en.wikipedia.org/wiki/online_analytical_processing.

* cited by examiner

1000

| 1002 | 1004 | 1006 | 1008 | 1010 | 1012 | 1014 |
|---|---|---|---|---|---|---|
| VPH ID | User ID | VPH IP address | Device 1 IP address | Device 1 ID | Device 1 data | Dest. URL for Dev. 1 data |
| 1002a | 1004a | 1006a | 1008a | 1010a | 1012a | 1014a |
| 1002b | 1004b | 1006b | 1008b | 1010b | 1012b | 1014b |
| 1002c | 1004c | 1006c | 1008c | 1010c | 1012c | 1014c |
| 1002d | 1004d | 1006d | 1008d | 1010d | 1012d | 1014d |

| 1102 | 1104 | 1106 | 1108 | 1110 | 1112 | 1114 |
|---|---|---|---|---|---|---|
| Device ID | Comm. Port | Device IPV6 address | Prompt report? | Time of last data | Time last transmitted | Device data |
| 123 | Serial A | 029343092234 | Yes | Date/time | Date/time | xxxxx |
| 345 | USB | 029343092234 | No | Date/time | Date/time | ssss |
| 567 | Bluetooth | 029343092234 | Yes | Date/time | Date/time | 12097 |
| 678 | Zigbee | 029343092234 | No | Date/time | Date/time | 828956 |

FIG. 11

VIRTUAL PERIPHERAL HUB DEVICE AND SYSTEM

RELATED APPLICATIONS

This application claims the benefit of priority to U.S. Provisional Patent Application No. 61/262,653 entitled "Virtual Peripheral Hub Device and System" filed Nov. 19, 2009, the enter contents of which are hereby incorporated by reference.

FIELD OF THE INVENTION

The present invention relates generally to computer networks, and more particularly a virtual peripheral hub for coupling electronic devices to remote computers by way of an intermediate server.

BACKGROUND

There is an increasing proliferation of peripheral devices that are connected to computers by way of Universal Serial Bus (USB) and other direct/wired connections. A few examples of these devices include cameras, medical sensors, external hard drives, digital music players, printers and less common devices such as weather stations. At present, use of such devices requires a direct connection to the accessing computer. Remote access may be supported by way of complex configuration and routing through an available local (e.g., LAN, WiFi, etc.) network. This complexity and overhead limits the utility and location of peripherals and relegates remote access to all but a small group of "tech savvy" users who understand the complexities of configuring the devices, networks and attached computers.

SUMMARY

The present invention involves methods, devices, services and software which enable remote access to peripheral devices that are normally connected directly to personal computers without the need for either an intermediate computer or local network. The various embodiments include a communication device that includes a processor, communication transceivers configured to connect to cellular and/or WiFi communication networks for accessing a remote server, and connectors and/or wireless transceivers for connecting to local peripheral devices.

In a simple embodiment, the communication device may take the form of a unitary device (referred to herein as a "Virtual Peripheral Hub" or "VPH") that is plugged into a power source (e.g., a wall socket) and attached to one or more peripheral devices (e.g., a camera, hard drive, printer, digital picture frame, etc.), configured with software to facilitate efficient data transmission between the connected peripheral(s), the service and remotely accessing computer(s). The VPH's handling of connected peripherals may be generic, allowing support for almost any current and future peripheral that can be plugged into the VPH. The VPH may also be powered by battery in alternate embodiments of the device. The VPH may support several connected peripherals, limited only by the number of physical connection ports on the device.

Connectivity is facilitated by wireless communication between the VPH device and the cellular network supporting a data connection between the VPH and an Internet-based service. This service supports user-authenticated discovery and communication between the peripherals connected to the VPH and remote computers accessing the peripherals. Like the VPH's handling of peripheral devices, the data protocol between the server, VPH and accessing computers can be generic, enabling support for almost any current and future peripheral devices or type of connected computer. The VPH may register connected peripherals with the service, making them available to remote accessing computer(s).

Software installed on the remote accessing computers communicates with the peripherals connected to the VPH by way of the service and the VPH. This software may also be generic, and simply passes the incoming data to applications accessing a virtual port (USB, etc.) on the computer. In this manner, the remote peripherals appear as local devices to the application software on the accessing computers.

Intelligence in the VPH and service may enhance the efficiency of wireless data transmission, facilitating an appearance of persistence in the connection to the peripherals while minimizing wireless/cellular network overhead.

Unlike a common single physical cable connection between the peripherals and an attached computer, the virtual nature of the connectivity to the peripherals via the VPH allows more than a single computer to access the same remote peripheral. For example, a camera that would generally be connected directly to a single PC may seamlessly become a remote peripheral accessed by a large number of accessing computers or devices. Likewise, the peripherals connected to the VPH may be accessed by a number of different remotely accessing computers. This configuration may be changed at any time based on remote computers interfacing with the VPH service.

As the VPH involves connectivity to an Internet-based service, access to the remote peripherals may be facilitated for any type of computer that is capable of hosting the software necessary to access the server, regardless of whether that computer has the native ability to host locally connected peripherals. This may include mobile devices (phones, smartphones, etc.) with applications capable of accessing the data from the server. It may also include "machine to machine" (M2M) applications where the remotely accessing computer supports no direct human interaction. An example is storage of private user email data from a service provider on a remotely connected owned and managed by the user.

Setup and configuration of the VPH, addition and removal of connected peripherals, and connectivity by remote computers may be managed at the service level. A user-based authentication mechanism may be used to associate an authenticated user and computer with the VPH and peripherals. Data transmitted between the VPH, server and computers may be encrypted to further enhance the privacy of the transmitted data.

In summary, this ability to access and receive data from a variety of peripheral devices to a wide variety of computers via a server-based service facilitates a wide variety of data applications and business services. The VPH also allows rapid and efficient deployment of existing and future peripheral devices (e.g., cameras, etc.) to locations which may not currently lend themselves well to such deployments.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 10 is an example data structure suitable for use in a virtual peripheral hub server according to various embodiments.

FIG. 11 is an example data structure suitable for use in a virtual peripheral hub device according to various embodiments.

DETAILED DESCRIPTION

Figure 1A:
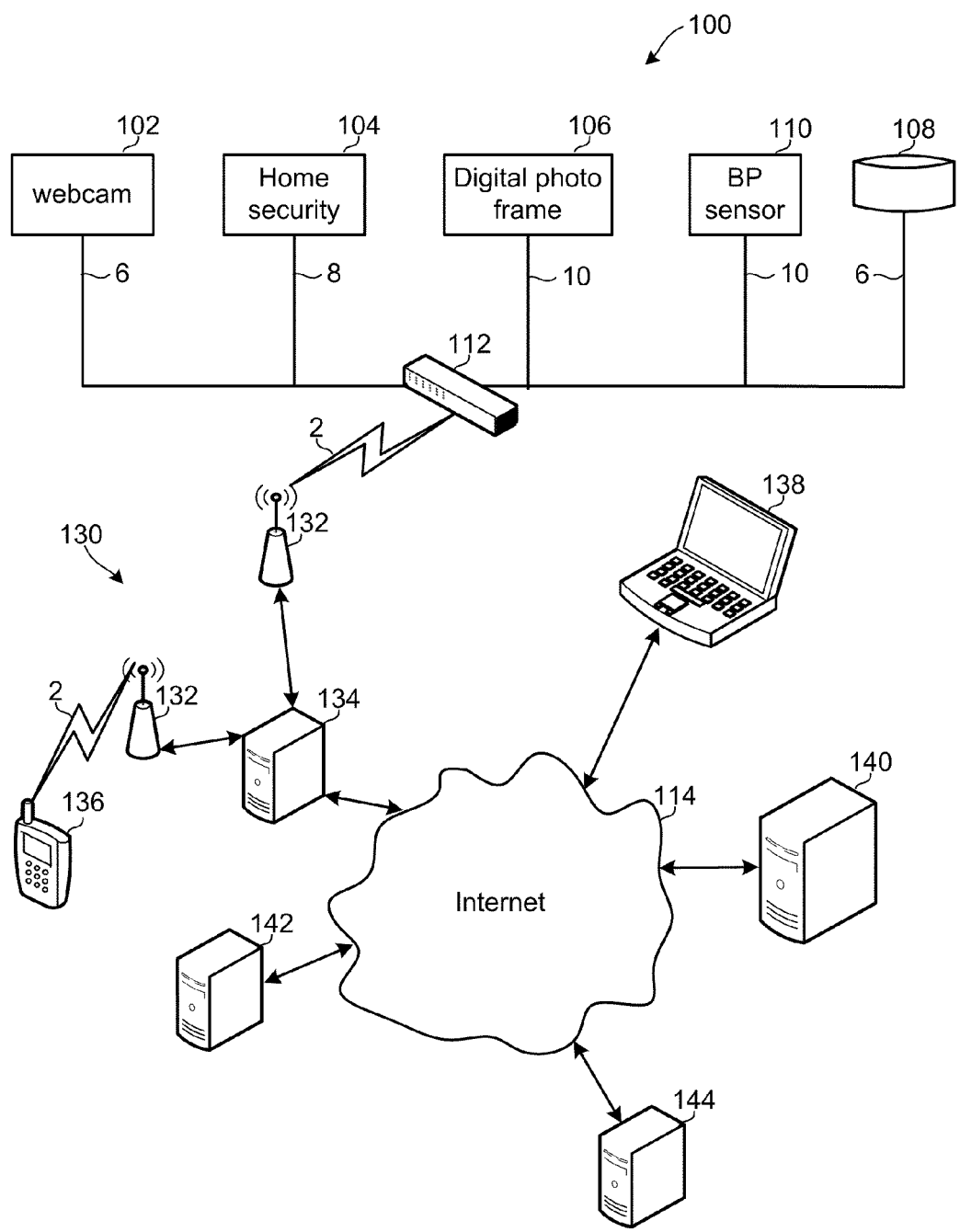
FIGS. 1A-1C are a communication system block diagrams illustrating communication systems suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "mobile device" refers to any one or all of cellular telephones, personal data assistants (PDA's), palm-top computers, wireless electronic mail receivers, multimedia Internet enabled cellular telephones, Global Positioning System (GPS) receivers, wireless gaming controllers, and similar personal electronic devices which include a programmable processor and memory and communicating with a wireless communication network.

As used herein, the terms "computer," "personal computer" and "computing device" refer to any programmable computer system that is known or that will be developed in the future. In a preferred embodiment a computer will be coupled to a network such as described herein. A computer system may be configured with software instructions to perform the processes described herein.

As used herein, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "device" refers to any electronic device, several examples of which are mentioned or described herein. In a preferred embodiment, a device includes a communication port enabling the device to be coupled to another computing device or a network.

Various aspects will be presented in terms of systems that may include a number of components, modules, and the like. It is to be understood and appreciated that the various systems may include additional components, modules, etc. and/or may not include all of the components, modules, etc. discussed in connection with the figures. Also, it is to be understood and appreciated that a number of components and modules may be combined into integrated circuits or chipsets. A combination of these approaches may also be used.

The various embodiments described herein provide devices, systems and methods that enable remote access to peripherals commonly connected to personal computers via USB, FireWire, serial ports, etc. using a virtual peripheral hub device that simplifies networking of devices to computing systems. The various embodiments include a communication device (referred to herein as a virtual peripheral hub device, or VPH) which includes a processor and communication transceivers configured to connect to cellular and/or WiFi communication networks. In a simple embodiment, the virtual peripheral hub device may be configured as a small, integrated module that can be plugged into a power source, such as a standard utility wall socket, and attached to one or more peripheral devices (e.g., a digital camera, hard drive, printer, digital picture frame, etc.). The virtual peripheral hub device may be configured with processor-executable software to enable connected peripheral devices to be used from any computer attached to a local area network or the Internet. An associated Internet server-based service enables discovery of the virtual peripheral hub device and connected peripherals. The virtual peripheral hub device may also be accessed from the Internet through the associated server-based service.

The various embodiments of the virtual peripheral hub device ("VPH" in the drawings), minimize the complexity of sharing peripheral devices by eliminating many of the requirements conventionally imposed on a host system and local network. Virtual peripheral hub devices can be placed in any location, stationary or mobile, and are configured so that the peripherals connected to the virtual peripheral hub device appear to the accessing computers as if they are locally connected. This is accomplished by way of intelligence and connectivity in the virtual peripheral hub device, the associated server-based service and, optionally, software that may be hosted on the accessing computer.

The basic virtual peripheral hub device concept also enables services in which large service providers (e.g., Google) "own" private user data. Starting with email, there has been a trend in the information businesses towards remote and centralized storage and management of all user content. The benefits to the service provider are many. However, this concept runs counter to the desire of many users to maintain physical control over their private data. The virtual peripheral hub device provides the capability of a "network enabled" removable storage media, such as a removable USB hard-drive, that enable universally accessible consumer data that remains locally "owned." The virtual peripheral hub device enables users to choose whether and how they wish to share their data without turning it over to a service provider or losing the ability to access it from any system. The virtual peripheral hub device embodiments enable broadening and generalizing this basic concept to encompass any connected peripheral device, making it appear as if the device is connected directly to the remote computer.

The various embodiments also simplify the traditionally challenging technical processes of networking peripheral devices, such as setup and initialization, security, driver management, and device sharing by way of a server-based supporting service element. This service also enables valuable communication and data utilization capabilities, such as batch operation support; access via the Web and intelligent sharing across user defined and controlled groups.

A virtual peripheral hub device may be configured to use models that mirror the types of devices that can be connected to PCs via USB (Universal serial bus) or FireWire ports. Just a few examples that may be coupled to a virtual peripheral hub device include removable storage, web cameras, remote vehicle diagnostics, digital cameras, digital picture frames, digital scales, home security systems and sensors, industrial sensors, and medical sensors. In short, the virtual peripheral hub device embodiments can broaden and extend the value of many connected peripherals. Employing the virtual personal hub device, peripheral devices can be placed virtually anywhere, shared across groups, accessed via the Internet or local networks, and supported by extended services which enable new use models and revenue opportunities.

Figure 1B:
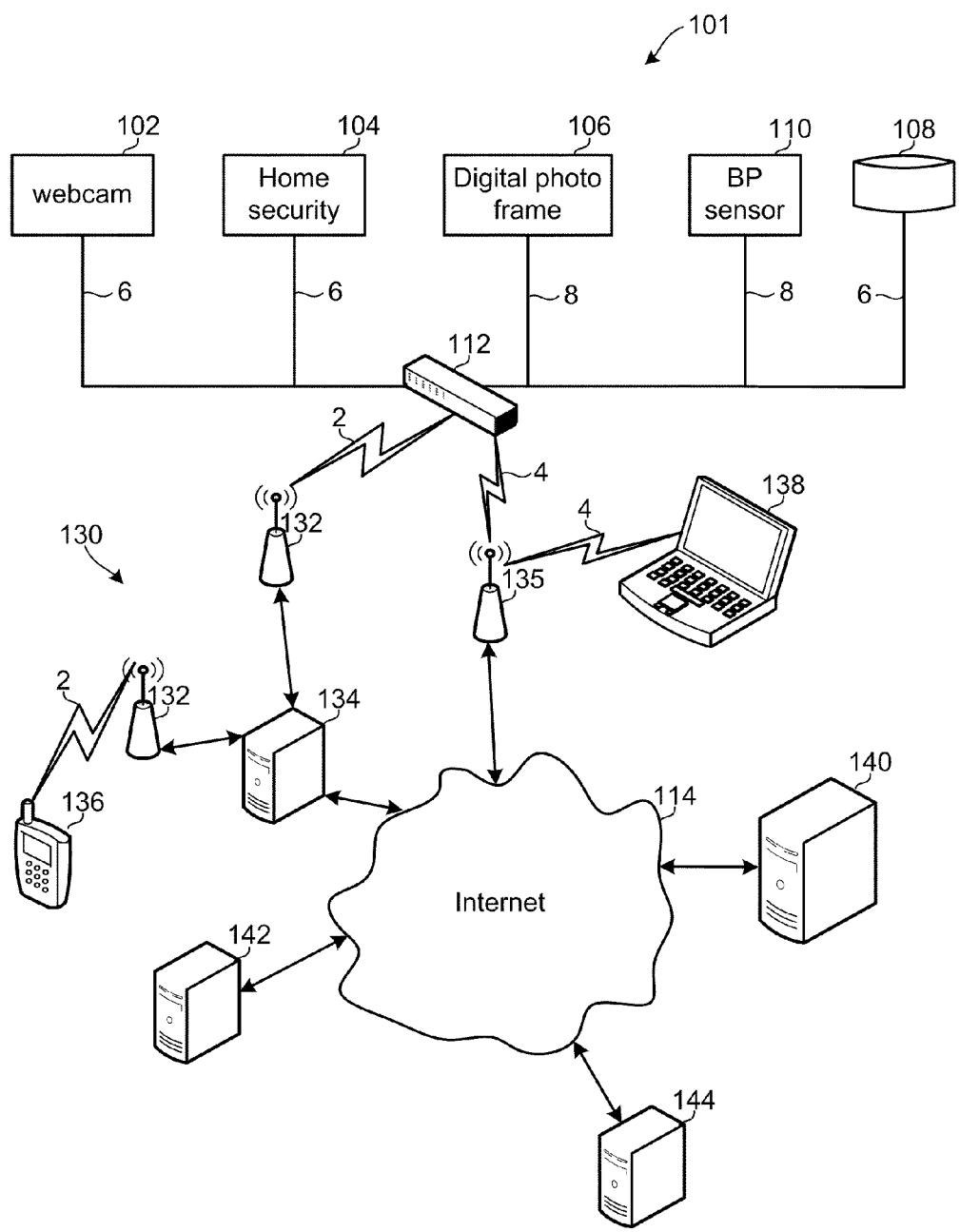
Figure 1C:
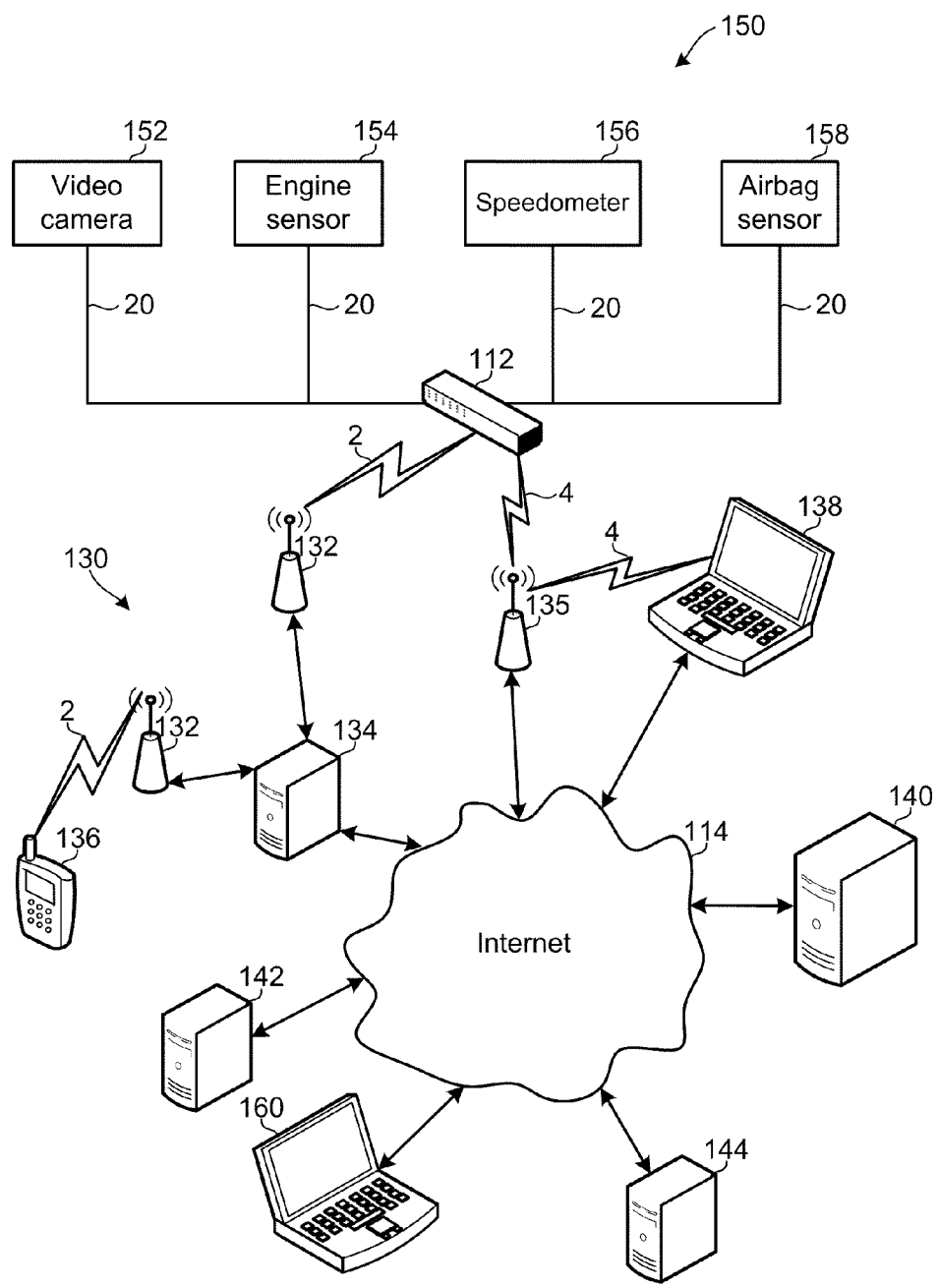

FIGS. 1A-1C illustrate system components that may be included in three example communication systems 100 making use of a virtual peripheral hub device 112. Referring first to FIG. 1A, the virtual peripheral hub device system is comprised of two core elements, the virtual peripheral hub device 112 and a virtual peripheral hub server (VPH-server) 140. The virtual peripheral hub device 112 may be sold to consumers and can be attach to USB, FireWire or wireless peripherals 102-110. The VPH-server 140 is coupled to the Internet and provides VPH-services, such as secure access to the virtual peripheral hub device 112 to enable connecting to the peripherals 102-110. Additionally, software drivers may be provisioned on a user's personal computer 138 to support direct secure access to the virtual peripheral hub device 112 and connection to the peripherals 102-110 via the virtual peripheral hub device 112 or VPH-server 140. These elements are described in more detail below.

The virtual peripheral hub device 112 can connect to peripheral devices 102-110 via direct (i.e., wired) connections, such as a USB connection 6, a FireWire connection 8 or local area network connection (e.g., Ethernet), as well as wireless communication links, such as Bluetooth 10, WiFi, and ZigBee wireless communication networks. For example, a webcam 102 may be coupled to the virtual peripheral hub device 112 by a USB cable 6 plugged into a USB port of the device to enable a user to access images from that device from a personal computer 138 using the VPH services provided by the VPH-server 140 as described more fully below. As another example, an external hard drive data storage device 108 may be coupled to the virtual peripheral hub device 112 by a USB cable 6 (or FireWire or Ethernet cable) to enable users to access their data remotely and to enable the VPH-server 140 to store the user's data (e.g., e-mail messages) on a hard drive controlled by the user. As a further example, a home security system 104 or a sensor within that system may be coupled to a virtual peripheral hub device 112 via a FireWire connection 8. So connected, alerts generated by the home security system 104 may be transmitted to an appropriate destination, such as a home security service provider server 142 via the VPH-server 140.

The VPH-server 140 may be configured to provide a variety of data and communication services related to virtual peripheral hub devices, the peripheral devices that may be connected to them, and data that may be obtained from such peripheral devices. Such services are generally referred to herein as "VPH services." One VPH service provided by the VPH-server supports user-authenticated discovery and communication between the peripherals connected to the VPH and remote computers accessing the peripherals, enabling users to setup accounts that provide access to the peripherals coupled to one or more virtual peripheral hub devices 112 registered to them (i.e., associated with their account). Authentication may be accomplished by the VPH server with respect to the VPH, peripherals coupled to the VPH, the computer accessing the VPH server via the Internet and/or the user of the computer using any known device and user authentication methods. This service may employ a custom protocol to communicate with particular peripheral devices connected a virtual peripheral hub device 112.

The VPH services may also handle normal interfacing and device management issues, such as allowing virtual peripheral hub devices 112 to enter an idle mode to minimize over-the-air (OTA) usage charges, and waking up an idle virtual peripheral hub device 112 when needed. Like the VPH's handling of peripheral devices, the data protocol between the VPH-server 140, the VPH 112, and the accessing computers can be generic, enabling support for almost any current and future peripheral devices or type of connected computer. The VPH may register connected peripherals with the VPH service, making peripherals available to remote computer(s).

The VPH services enabling access to the remote peripherals may be facilitated for any type of computer capable of hosting the software necessary to access the VPH server, regardless of whether that computer has the native ability to host locally connected peripherals. Thus, accessing computers may include mobile devices (e.g., phones, smartphones, etc.) with applications capable of accessing the data from the VPH server. The VPH services may also include "machine to machine" (M2M) applications where the remotely accessing computer supports no direct human interaction. An example is storage of private user email data from a service provider on a remotely connected owned and managed by the user.

Another service of VPH services may be the setup and configuration of the VPH, including support for the addition and removal of connected peripherals, and connectivity by remote computers.

Another service of the VPH services may be user-based authentication using mechanisms that can be used to associate an authenticated user and computer with the VPH and its connected peripherals. Data transmitted between the VPH, the VPH server and computers may be encrypted to further enhance the privacy of the transmitted data.

The VPH services may also enable accessing peripheral devices from any Internet-connected computer (e.g., web kiosks) when a user is away from the user's personal computer 138. The VPH services may also include storage, relaying and utilization of data obtained from peripheral devices connected to a virtual peripheral hub device 112. Such utilization of peripheral device-provided data made possible by the virtual peripheral hub system may enable a variety of useful applications and new business models, some examples of which are described more fully below.

In a further embodiment, intelligence in the VPH and VPH server may enhance the efficiency of wireless data transmission, facilitating an appearance of persistence in the connection to the peripherals while minimizing wireless/cellular network overhead. In this manner, the VPH server may "host" the latest data or status from peripherals for access by computers enabling the appearance that the peripherals are continuously connected to a computer accessing the peripherals via the VPH server, without the need to maintain a constant communication link between the peripherals, VPH and VPH server. Depending upon the nature of the peripheral, data provided by the peripheral, status states of peripheral, or current circumstances, establishment of an active communication link to transmitted updated data from the peripheral may be accomplished on an as-needed basis. By configuring the VPH and the VPH server with intelligence, a wide variety of peripheral applications can be supported while minimizing communication costs. Such flexibility may be illustrated by way of a few examples.

In an example application in which the peripheral device is a home security system, the VPH may be configured with intelligence to only connect with the VPH server to report a change in security status, which the VPH server may store and post as the current status. The status of a home security system (e.g., open/closed status of doors and windows, room temperature, motion sensors, etc.) will typically change rarely. Thus, full system functionality may be provided while minimizing communication costs by a VPH configured to sense a change in status, and establish a connection to the VPH server to report an updated status upon detecting a change in status. In this manner, a user contacting the VPH server to check on the status of the user's home would receive an up to date status report without the need to have or establish an active communication link to the VPH.

In an example application in which the peripheral device is a webcam or security camera, the VPH may be configured with intelligence to only connect with the VPH server to provide an image from the camera when there is a change in the image, which the VPH server may store and post as the current image. In many implementations of webcams and security cameras, the camera image may change only occasionally, depending upon where it is aimed and the time of day. Thus, "live" photo imagery may be provided while minimizing communication costs by a VPH configured to analyze the camera image to detect a change in the image, and establish a connection to the VPH server to transmit updated imagery upon detecting such a change. In this manner, a user contacting the VPH server to view the webcam or security camera image would receive an up to date image without the need to have or establish a continuous communication link to the VPH.

In a similar manner, the appearance of persistence may be provided for peripherals whose status or output data change episodically by configuring the VPH to sense such a change, and report it to the VPH server when the change is detected. In applications in which the peripheral status or output data is generated or changes periodically, the VPH may be configured to establish a link to the VPH server periodically so that the current status/data stored and posted by the VPH server is near real time.

As mentioned above, users' personal computers 138 may be provisioned with virtual peripheral hub driver software. The basic function of such driver software may be to support transparent access to peripheral devices 102-110 connected to a virtual peripheral hub device 112. Such driver software may provide virtualized access to the USB or FireWire port across a local network 150 or a wide area network (e.g., the Internet 114), and may be used to support secure access to virtual peripheral hub device devices 112 through the VPH-server 140. Such driver software may be made available from a VPH services website (such as may be hosted by the VPH-server 140), and may include the necessary encryption keys to access specific peripheral devices coupled to a virtual peripheral hub device 112 associated with a user. Such encryption keys may be generated during the device setup, registration and configuration phase, which is described below with reference to FIG. 5.

Unlike a common single physical cable connection between the peripherals and an attached computer, the virtual nature of the connectivity to the peripherals via the VPH allows more than a single computer to access the same remote peripheral at a given time. For example, a webcam, security camera, or other camera peripheral that would generally be connected directly to a single computer system, can seamlessly become a remote peripheral accessed by a large number of accessing computers or devices. Likewise, the peripherals connected to the VPH may be accessed by a number of different remotely accessing computers. Further, the connectivity and access permissions configuration may be changed at any time by remote computers interfacing with the VPH service.

Third-party servers 142, 144 may communicate with the VPH-server 140 via the Internet 114 to receive data from or communicate data to peripheral devices 102-110 connected to a virtual peripheral hub device 112. Further explanation of how data may be communicated among the components of the communication system 100 is provided below with reference to FIGS. 2A-2D.

In an embodiment, the virtual peripheral hub device 112 may also include a wireless transceiver capable of communicating with local wireless networks, such as a WiFi network, as illustrated in communication network 101 shown in FIG. 1B. As described above with reference to FIG. 1A, the virtual peripheral hub device 112 may include a cellular transceiver enabling it to communicate via the cellular signals 2 with a cellular data network 130. Additionally, the virtual peripheral hub device 112 may include a local area wireless transceiver (e.g., a WiFi transceiver) enabling it to also communicate with a local wireless network via a wireless router 135. In this embodiment, the virtual peripheral hub device 112 may be accessed from a personal computer 138 via the wireless router 135 through local wireless transmissions 4. Additionally, the virtual peripheral hub device 112 may access the Internet 114 via the wireless router 135 when it includes a connection to the Internet 114 (as is typical in many household wireless network implementations). Communications with and among the various peripheral devices 102-110 and the VPH-server 140 may proceed in this embodiment as described above with reference to FIG. 1A.

In a further embodiment illustrated in FIG. 1C, a virtual peripheral hub device 112 may be connected to nontraditional peripheral devices, such as sensors and systems of an automobile is shown in the communication network 150. By installing a virtual peripheral hub device 112 in an automobile, for example, various vehicle sensors and systems can be connected to the device, such as by means of a cable hooked up to the standard automobile interface that is typically accessed by automobile service mechanics. This standard interface enables a connected computer to receive information about the engine and other vehicle sensors which may be useful for maintenance and troubleshooting purposes. However, to use such a data interface, most vehicle owners must bring their automobile to the service center. By plugging a virtual peripheral hub device 112 into this standard vehicle interface, the communication network 150 enabled by the virtual peripheral hub device 112 and the VPH-server 140 can deliver the vehicle data to the mechanics computer 160 no matter where the user's automobile is located.

In this embodiment, the virtual peripheral hub device 112 may be powered by the vehicle's electrical system, such as by being plugged into a cigarette lighter socket. Information from vehicle sensors, such as a video camera 152 (e.g., a backup camera), one or more engine sensors 154, the vehicle speedometer 156, an airbag deployment sensor 158, and other sensors may be transmitted to the virtual peripheral hub device 112 by a data cable 20, such as the standard data cable used for connecting to the standard vehicle interface. Data received from the vehicle sensors 152-158 may then be communicated via a cellular data network 130 and the Internet 114 to the VPH-server 140. The VPH-server 140 may store the vehicle data and provide access to the data, via the Internet 114, such as from a mechanic's computer 160 accessing a webpage or database hosted by the VPH-server 140. Driver software for interpreting the vehicle sensor data may also be loaded on the VPH-server 140 so that a user may access the sensor data from any personal computer 138 with access to the Internet 114. Thus, the user's computer 138 need not have the driver software necessary to interpret data messages from the vehicle speedometer 156 to enable a user to view the current speed or odometer reading (e.g., to check up on a teenage driver). Instead of interpreting the vehicle sensor data directly on the user's computer 138, the desired information may be accessed from the VPH-server 140 via the Internet 114.

As mentioned above, the virtual peripheral hub device 112 can enable two-way data communication with peripheral devices. Thus, in the example illustrated in FIG. 1C, a mechanic may be able to adjust a vehicle setting from the mechanic's computer 160 no matter where the vehicle is located. To accomplish this, the mechanic may enter instructions into a personal computer 160 which transmits them via the Internet 114 to the VPH-server 140. The VPN-server 140 can relate those instructions via the Internet 114 and a cellular network 130 to the virtual peripheral hub device 112. Depending upon the nature of the command instructions, the VPH-server 140 may transmit the mechanic's commands in encapsulated IP data packets which the virtual peripheral hub device 112 can receive without having to interpret the packet contents. The virtual peripheral hub device 112 may unpack the command messages from the received encapsulated IP data packets and relay the commands to the appropriate automobile peripheral device via the interface data cable 20.

When implemented in a vehicle as illustrated in FIG. 1C, the virtual peripheral hub device 112 can enable an emergency vehicle monitoring system similar to that available on vehicles equipped with the OnStar® system. Thus, any vehicle can be quickly configured to report emergency information, such as the deployment of an airbag as indicated by an airbag sensor 158 along with current GPS coordinates information (provided by a built in GPS receiver), via a cellular network 130. In such an implementation, the VPH-server 140 may receive the emergency signal and coordinate information, and relay the information to a server 144 of an appropriate emergency response center.

As mentioned above with reference to FIG. 1B, the virtual peripheral hub device may also include a local wireless and networked transceiver enabling it to connect to a local WiFi network wireless router 135 when one is available. For example, when the vehicle is parked in the owner's garage and, thus, able to access the owner's home wireless router 135, the virtual peripheral hub device 112 may report its data via the wireless router 135 to a user's personal computer 138, as well as to the VPH-server 140. Similarly, when the vehicle is driven into a repair shop, the virtual peripheral hub device 112 may connect to the shop's local wireless router 135 and begin reporting vehicle sensor data to the mechanic's computer 160 even before the mechanic begins to work on the vehicle.

In addition to facilitating maintenance and checking on the condition of a vehicle, vehicle component and driving data obtained from vehicle sensors may be useful to a number of businesses, such as automobile manufacturers, vehicle component manufacturers, insurance companies, taxing authorities, and advertisers, to name a few. Such information may be obtained by the VPH-server 140 and made available via the Internet 114 to the servers 142, 144 of such data users. As described herein, entities that would like particular types of information, such as engine performance data (which might be of interest to the engine manufacture) may request such information by a server 142 making a data request to the VPH-server 140. If the requested data is not available in the VPH-server data store, the VPH-server 140 may send a data query to the virtual peripheral hub device 112 via a cellular network 130 requesting it to poll the appropriate sensors and reply with the requested data.

As illustrated in FIGS. 1A-1C, data available via the virtual peripheral hub device 112 may also be made accessible to other computing devices which can connect to the network to which the virtual peripheral hub device 112 is connected, such as a cellular telephone 136 accessing a cellular data network 130. Thus, the user may be able to view a webcam 102 image, check on a home security situation, or be alerted to an issue detected by a vehicle sensor on the user's mobile device 136. The various embodiments may be particularly useful in such applications since the driver software for the various peripheral devices need not be resident on the mobile device 136, which typically has limited memory capacity. Instead, the mobile device 136 can access the desired information via the VPH-server 140 which may have all necessary device driver software stored on its large capacity disk drives.

Operations of the virtual peripheral hub device and the VPH services can be appreciated by reference to FIGS. 2A-2D which highlight in dark lines the components and communication links utilized in the described examples, while components and links not discussed are deemphasized.

Figure 2A:
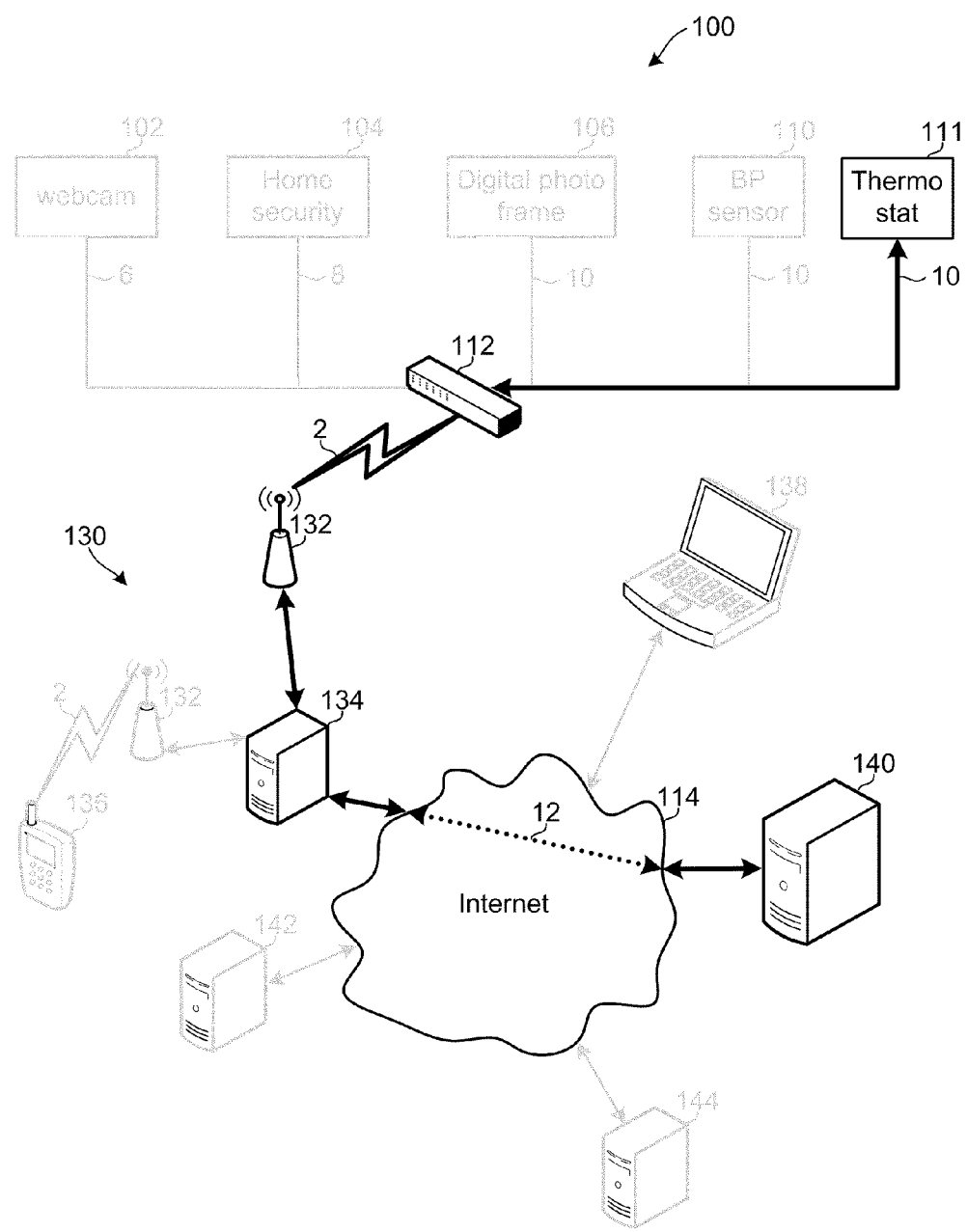
FIGS. 2A-2C are communication system block diagrams illustrating functionality of various embodiments.

Referring FIG. 2A, temperature data from a thermostat 111, such as a digital thermometer implemented within a home thermostat, may be communicated to the virtual peripheral hub device 112 via a local wireless communication link 10, such as a Bluetooth® or WiFi communication link. The virtual peripheral hub device 112 may be configured to receive this data and transmit it via cellular data communications 2 to the nearby cellular base station 132 which relays the information to a cellular network Internet access server 134. The virtual peripheral hub device 112 packages the temperature sensor data in data packets so that they may travel via Internet protocol (IP) packets 12 to the VPH-server 140. The virtual peripheral hub device 112 may use well-known data tunneling communication techniques so that the temperature sensor data is encapsulated within IP packets 12 so that they arrived at the VPH-server 140 in native format. The VPH-server 140 may utilize driver software for the thermostat 111 to receive and interpret the temperature sensor data, and make the data available in a standard format (e.g., as within an HTTP webpage). The VPH-server 140 may also transmit data or commands back to the thermostat 111, such as commands to change a thermostat temperature setting, by encapsulating the commands in IP packets 12 that are communicated to the virtual peripheral hub device 112 via the cellular network 130. Upon receiving such packets, the virtual peripheral hub device 112 may unpack the commands and relay them via the local wireless communication link 10 to the thermostat 111.

Figure 2B:
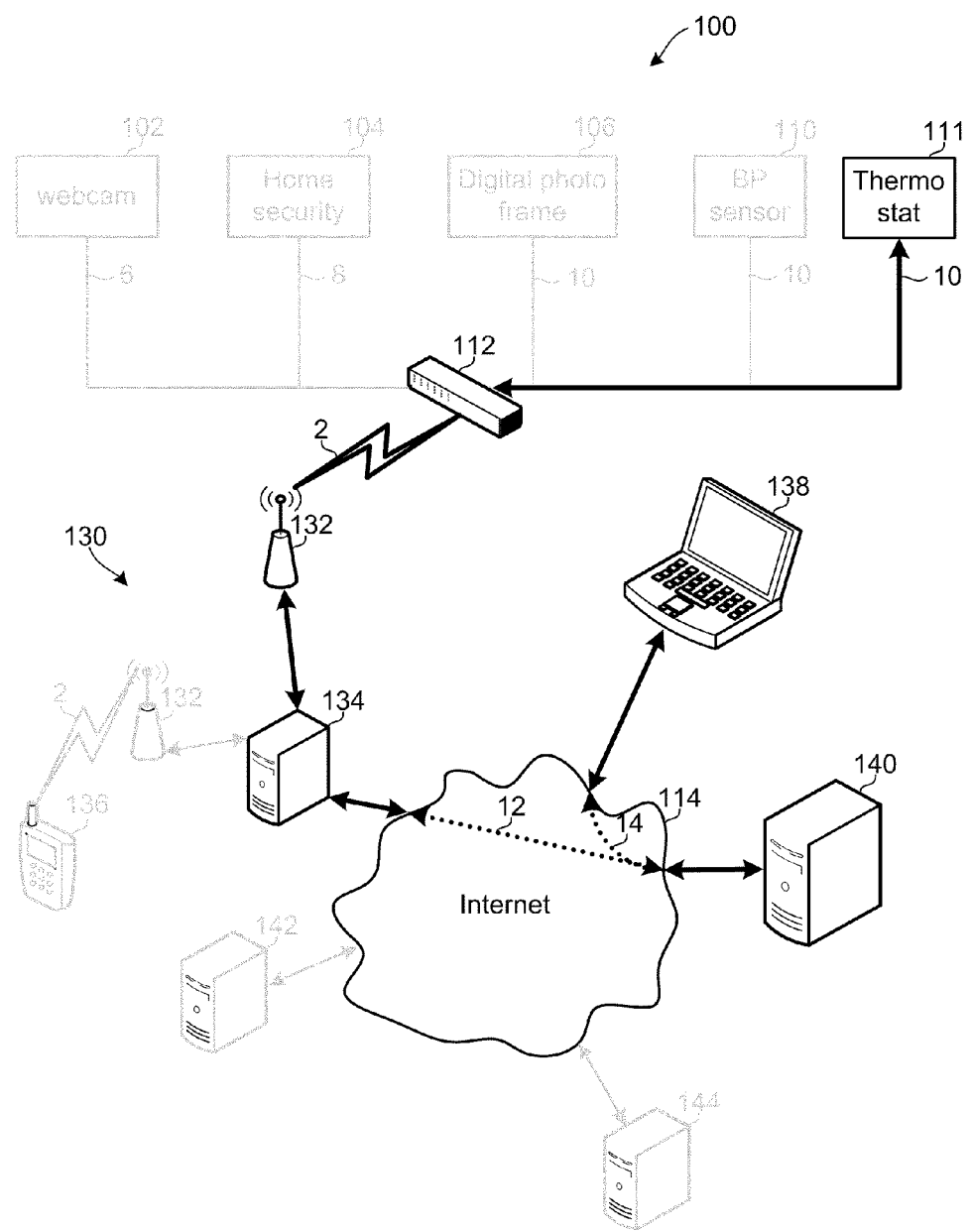

This communication of data from the thermostat 111 through the virtual peripheral hub device 112 to the VPH-server 140 may also make the data available to a user via a personal computer 138 as illustrated in FIG. 2B. To access the thermostat 111, a user may use a personal computer 138 to access the VPH-server 140 via a website access IP message 14. Once the user or use's computer 138 has been identified to the VPH-server 140, such as by the entry of a username and password or the exchange of appropriate verification keys, the user's personal computer 138 may transmit a request for the temperature sensor data to the VPH-server 140 via the Internet 114. If the VPH-server 140 has the requested data in memory, the query may be answered immediately. If not, the VPH-server 140 may send a data request message to the virtual peripheral hub device 112 via the Internet and the cellular data network 130. As described below in more detail, the VPH-server 140 may first send a message to the virtual peripheral hub device 112 causing it to "wake up", such as by sending an SMS message via the cellular network 130. Once a communication link is established with the virtual peripheral hub device 112 and the data request message is delivered, the virtual peripheral hub device 112 may poll the thermostat 111 for the requested information and relay the data back to the VPH-server 140. When it receives the requested data, the VPH-server 140 may relate the data to the personal computer 138 via IP data messages 14. In a similar manner a user may issue commands to the thermostat 111 (e.g., to adjust a temperature setting) by communicating the setting from the personal computer 138 to the VPH-server 140 which transmits the appropriate command via the Internet 114 and cellular network 130 to the virtual peripheral hub device 112 for relay to the thermostat 111.

Figure 2C:
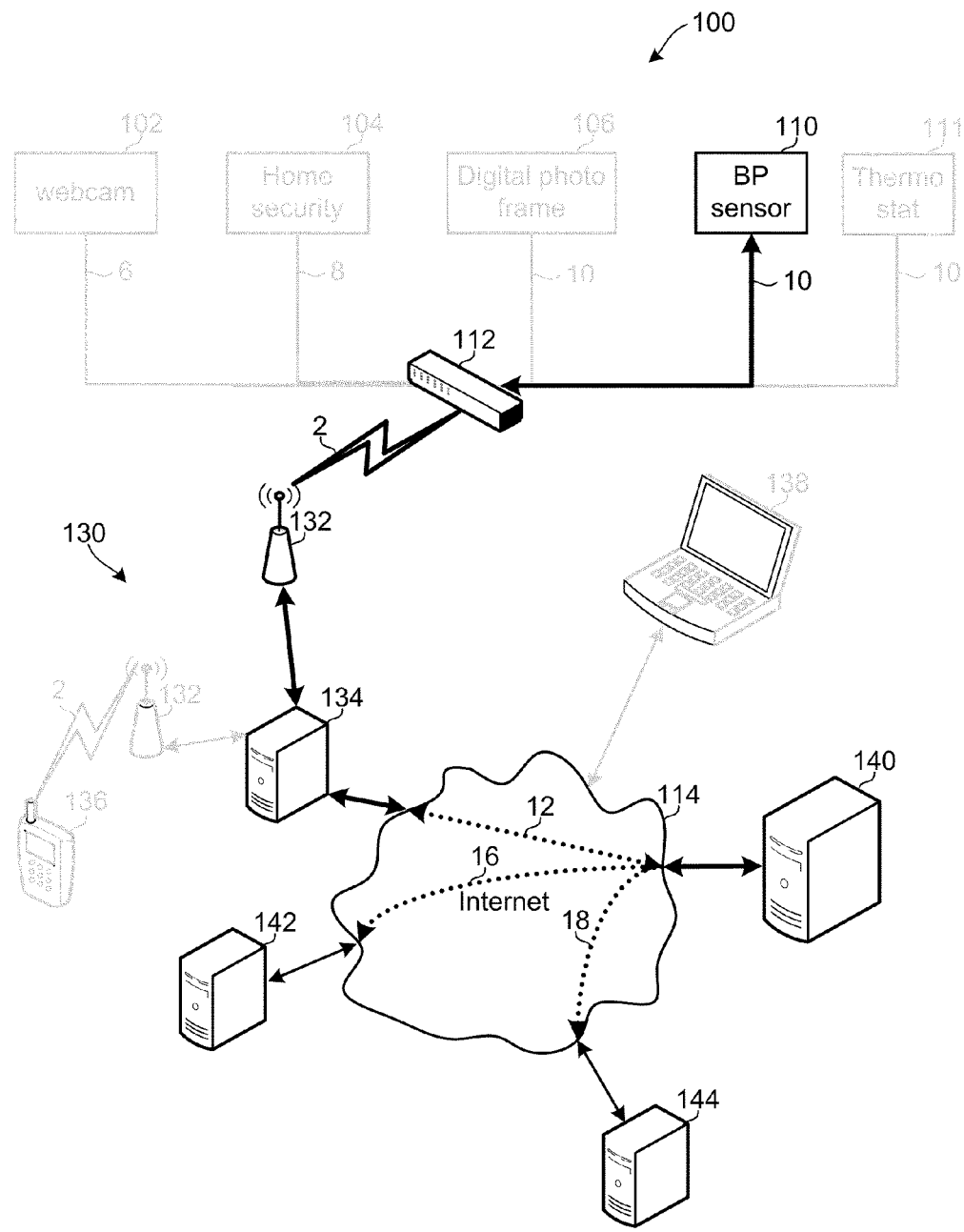

Another example of a useful application of the communication network 100 enabled by VPH services is illustrated in FIG. 2C. In this example, the peripheral device is a medical sensor, such as a blood pressure ("BP") sensor 110. Data from medical sensors may be of interest to a number of different parties, including the user's physician, a local hospital monitoring the user, medical insurance carriers, manufacturers of the user's blood pressure medication, and manufacturers of the blood pressure sensor 110, to name just a few. As illustrated in FIG. 2C, the virtual peripheral hub device 112 and the VPH-server 140 can make such medical data available to those entities which needed it without the complication of making the blood pressure sensor 110 network accessible, establishing a network encompassing the sensor, or deploying drivers for the blood pressure sensor to other computers. Once the virtual peripheral hub device 112 is installed and registered with the VPH-server 140, it can be connected to the medical sensor, such as a blood pressure sensor 110, by a cable (e.g., a USB cable 6 or FireWire cable 8) or a wireless communication link (e.g., a Bluetooth® 10 as illustrated). Once connected, the virtual peripheral hub device 112 can report the connection to the blood pressure sensor 110 to the VPH-server 140 which may maintain data records for storing data received from the sensor. Data packets received from the blood pressure sensor 110 by the virtual peripheral hub device 112 may be encapsulated in IP packets which are relayed as cellular data communications 2 to a cellular communication network 130 which applies them to the Internet 114 for delivery to the VPH-server 140. By tunneling the data packets received from the blood pressure such 110 to the VPH-server 140 within encapsulated IP packets, the virtual peripheral hub 112 does not have to be configured with driver software for interacting with the blood pressure sensor 110. Instead, the encapsulating IP packets from the virtual peripheral hub device 112 may be received by the VPH-server 140, which unpacks the packets so the blood pressure sensor 110 data can processed by the appropriate driver software that is resident on the server. With the blood pressure sensor data stored on the VPH-server 140, this information may be made accessible via the Internet 114 to other entities which may have use for the data. For example, the processed blood pressure sensor data may be transmitted to a doctor's computer or hospital server 142 as hypertext transfer protocol IP (HTTP/IP) packets 16, such as in response to queries posed to a website hosted by the VPH-server 140.

The communication network 100 illustrated in FIG. 2C may also enable hardware manufacturers to control or limit the distribution of driver software in order to maintain control over the data or peripheral devices for which they are responsible. For example, some medical device manufacturers may choose to maintain device drivers as proprietary software so that data from their products can only be interpreted by their in-house servers. Such limitations may be appropriate to prevent storage of sensitive patient information on databases accessible via the Internet 114. Such limitations may also be appropriate to ensure that medical devices cannot be reprogrammed or controlled by unauthorized individuals. To support such an implementation, the VPH-server 140 may forward unprocessed data packets received from such a proprietary sensor (e.g., blood pressure sensor 110) as encapsulated IP packets 18 to the device manufacturer's server 144 via the Internet 114, or another network (not shown). The manufacturer's server 144 may then use its proprietary driver software to interpret the data received from the peripheral device.

As noted above, the communication link to the peripheral devices (e.g., blood pressure sensor 110) enabled by the VPH-server 140 and virtual peripheral device 112 can support reverse communications in a similar manner. Thus, a medical facility or manufacture of the peripheral device may transmit settings commands to the device using the communication links illustrated in FIG. 2C. For example, a doctor receiving readings from the blood pressure sensor 110 via a medical server 142 may transmit a message to be displayed on a screen of the blood pressure sensor 110 or another peripheral device coupled to the virtual peripheral hub device 112.

In addition to the basic functionality of the VPH services, there are numerous opportunities for advanced features that may be added by software developers, peripheral device manufactures, and data services companies. Some illustrative examples include: device and data sharing across groups; easy setup of LAN and WiFi connectivity of connected devices where available; periodic access to devices such as web-accessible video cameras ("webcams") for security or other monitoring purposes; and targeted advertising to users based on the data flowing through the system. The monetization of the various services enabled by the virtual peripheral hub device 112 and the VPH services may provide numerous opportunities for new businesses and the generation of new revenue streams.

Figure 2D:
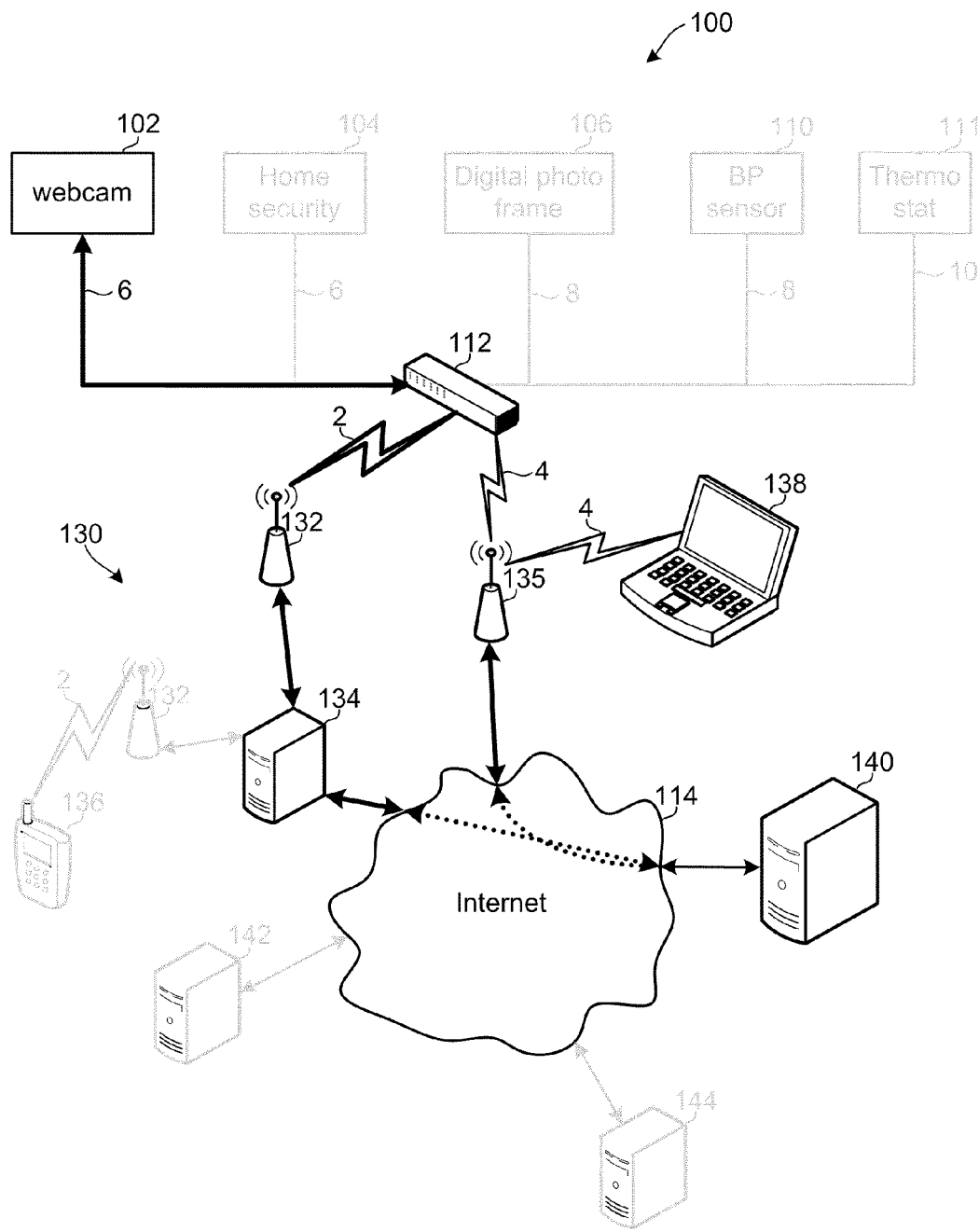

As mentioned above, an embodiment of the virtual peripheral hub device 112 may include a local wireless network transceiver (e.g., WiFi transceiver) enabling it to communicate with computers and devices networked via a local wireless router 135. Such communications may be enabled by the VPH-server 140 and the VPH services provided in the various embodiments. An example of this is illustrated in FIG. 2D, which shows a personal computer 138 coupled to a wireless router 135 that is in communication with both a virtual peripheral hub device 112 and the Internet 114.

One challenge faced by those who set up local wireless networks involves discovering and establishing communication links with all devices that may be accessed via the network. This challenge is simplified by the services provided by the virtual peripheral hub device 112 and the VPH-server 140. Referring to FIG. 2D, when the virtual peripheral hub device 112 is installed and initially activated, it may report to the VPH-server 140 all of the commercial devices coupled to it by wired (e.g., USB connector 6, FireWire 8) or wireless links (e.g., BlueTooth® link 10). As part of the registration process the VPH-server 140 may assign unique IPv6 addresses to each of the peripheral devices coupled to the virtual peripheral hub device 112. These IPv6 addresses can then be used by a local computer 138 to access specific peripheral devices via the virtual peripheral hub device 112. Thus, to access a particular peripheral hub device, such as a webcam 102, a user may use a personal computer 138 coupled to the Internet 114 via a local wireless router 135 to access the VPH-server 140. After registering with the VPH-server 140, such as by entering a username and password or exchanging verification keys, the user may request and receive a listing of all peripheral devices coupled to the virtual peripheral hub device 112, including their IPv6 addresses. Once the user's personal computer 138 has the IPv6 addresses of the peripheral devices, the computer 138 may then access particular peripheral devices via wireless communications 4 through the wireless router 135 to the virtual peripheral hub device 112. Command signals, such as data access requests, transmitted by the local computer 138 that are addressed to a particular peripheral device, such as a webcam 102, using the IPv6 address provided by the VPH-server 140 will be relayed by the virtual peripheral hub device 112. Thus, one of the VPH services enabled by the various embodiments is simplified network establishment with peripheral devices coupled to the virtual peripheral hub device 112.

The various embodiments of the VPH and the VPH services can enable rapid and efficient deployment of existing and future peripheral devices (e.g., cameras, etc.) to locations and circumstances which may not currently lend themselves well to such deployments. For example, a battery powered VPH may be coupled to a webcam or digital camera to establish an instant surveillance capability without the need for running cables, configuring routers and networks, or configuring the devices. Connectivity and configuration, including providing drivers for receiving the camera imagery can be handled automatically by the VPH and the VPH services. As another example, a printer normally configured for stand alone operation may be instantly configured as a networked printer without the need for network connection, or network configuration. In this manner, a printer may be quickly accessed by any number of computers in a temporary configuration simply by plugging its USB connection into a VPH.

Figure 3A:
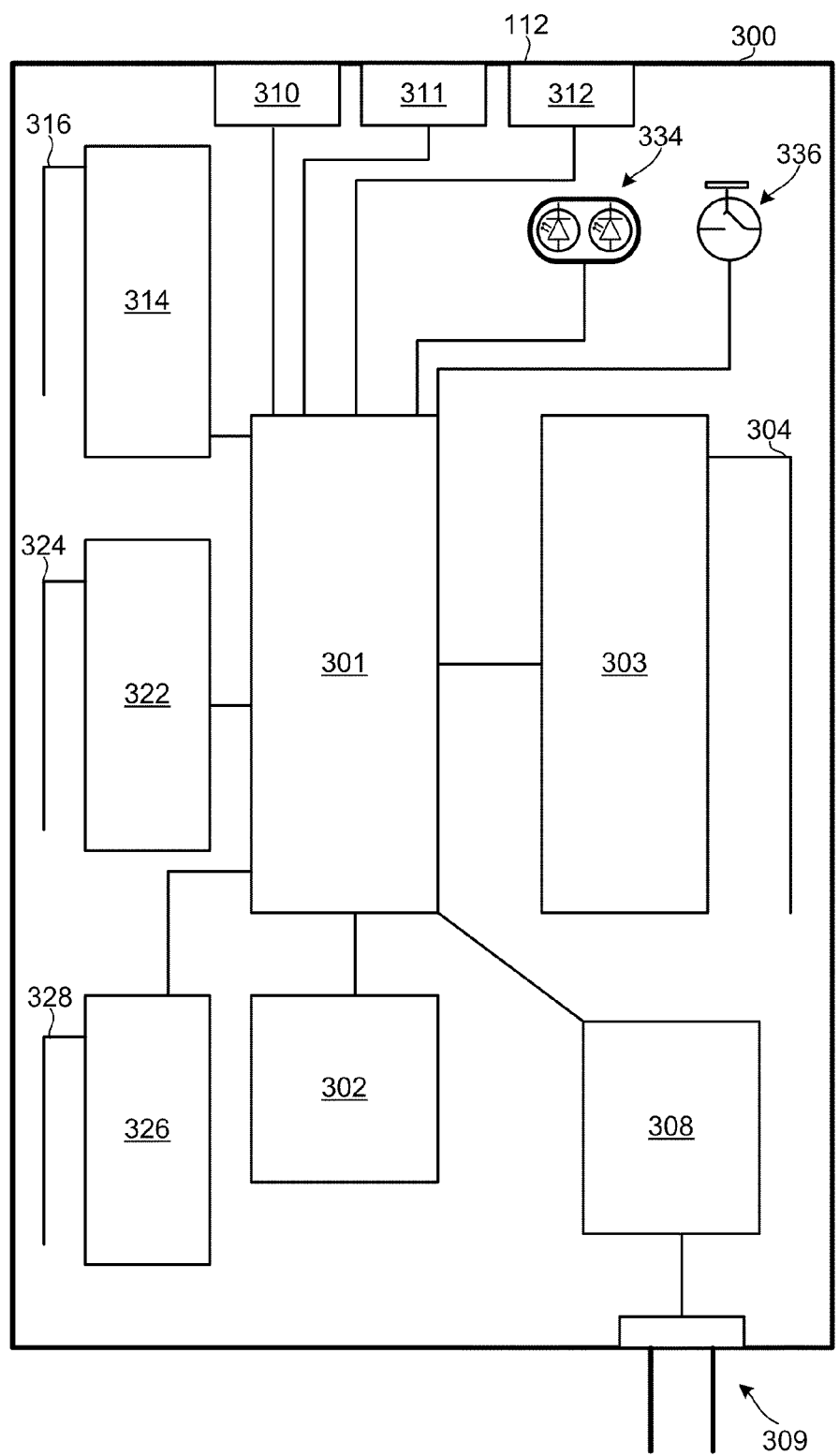
FIG. 3A is a component block diagram of a virtual peripheral hub device according to an embodiment.

Example components of a virtual peripheral hub device 112 embodiment are illustrated in FIG. 3A. The virtual peripheral hub device 112 may be configured in a case or housing 300 and may include a programmable processor 301 that is coupled to internal memory 302, and to a cellular data network transceiver 303 which is coupled to an antenna 304. A power supply 308 may be coupled to the processor 301 and other components. In some embodiments, the power supply 308 may include a battery. In a preferred embodiment, the power supply 308 may be electrically connected to a power plug 309 for plugging into a standard utility wall socket. The processor 301 may also be coupled to one or more wired network connection sockets, such as a USB port 310, a FireWire port 311 and/or an Ethernet socket 312. In a simple embodiment, only a single USB port 310 may be provided. In other embodiments, the virtual peripheral hub device 112 may include multiple USB ports 310, FireWire ports 311, and Ethernet sockets 312 to enable connecting a number of peripheral devices via data cables. Providing an optional Ethernet port 312 within the virtual peripheral hub device 112 may enable connecting the hub directly to a LAN or local network router 135. The number of ports may differ among the various embodiments depending upon the physical design of the housing and the particular market or application for which the virtual peripheral hub device 112 is configured.

In some embodiments, the virtual peripheral hub device 112 may also include one or more wireless local area network transceivers for coupling to peripheral devices via wireless communication links. For example, the processor 301 may be coupled to a Bluetooth® transceiver 314, which is connected to an antenna 316, and to an IEEE 802.11 (i.e., WiFi) transceiver 322, which is coupled to an antenna 324, for establishing wireless indication links to peripheral devices. As described above, a WiFi transceiver 322 may also be connected to the processor 301 for use in coupling the virtual peripheral hub device 112 to a local area wireless router 135. Other local wireless transceivers may also be included, such as a Zigbee transceiver (not shown) for coupling to a Zigbee protocol network. In some embodiments, the virtual peripheral hub device 112 may include a global positioning system (GPS) receiver 326 coupled to the processor 301 and to an antenna 328. It should be noted that instead of having multiple antennas 304, 316, 324, 328, the virtual peripheral hub device 112 may include a single integrated antenna, or two or more transceivers may share a common antenna. Also, in some embodiments, the virtual peripheral hub device 112 may not include wired network connection sockets (i.e., USB port 310, FireWire port 311 and Ethernet socket 312 are optional), and instead include only one or more wireless local area network transceivers for coupling to peripheral devices via wireless communication links.

Since the virtual peripheral hub device is intended to be simple for users to implement, it may include a very rudimentary user interface. For example, the processor 301 may be coupled to one or more light emitting diodes (LEDs) 334 for communicating status, and to one or more buttons 336 for receiving simple user command inputs (e.g., push to activate or restart).

While FIG. 3A shows the various components of the virtual peripheral hub device 112 as separate integrated circuits, several components may be integrated into a single very large-scale integrated (VLSI) chip or assembled as an integrated chipset on a single circuit board as is well-known in the art. For example, many modern cellular telephone transceivers, such as the Gobi™ cellular chipset module manufactured by QUALCOMM, Inc., include a powerful processor, transceivers for connecting to WiFi networks and Bluetooth enabled devices, a built-in GPS receiver, and circuitry for connecting to wired connections such as a data port for receiving USB, FireWire and/or Ethernet connections. Thus in an embodiment, the virtual peripheral hub device 112 may be assembled by configuring a Gobi™ module (or similar cellular transceiver) within a housing 300 with an appropriate power supply 308, one or more antennas 304, one or more LEDs 334, one or more buttons 336, and connections to sockets for receiving USB, Firewire, Ethernet or other wired inputs. Configuring a virtual peripheral hub device around a sophisticated cellular transceiver module, like the Gobi™ module, can provide 3G cellular, WiFi, and Bluetooth connectivity in a single small package.

The processor 301 within a virtual peripheral hub device 112 may be configured with processor-executable instructions (which may be stored in memory 302) to enable the processes and communications of the various embodiments described herein. Such software may include the processes required to communicate with a cellular communication network 130 as well as establishing local networks with peripheral devices. Such software may also include a custom protocol for managing communications between the virtual peripheral hub device 112 and the VPH-server 140, as well as with a user's personal computer 138. Such software may also control processes for identifying and communicating with peripheral devices even without having a device driver installed on the processor 301, including packaging received data for transmission to the VPH-server 140 by "tunneling" via the Internet. Such software may also include processes to minimize the cost of operation or maximize battery life (when implemented in a battery powered configuration) by causing the cellular transceiver to go into an idle mode, and wake up in response to inputs from peripheral devices or signals received from a VPH-server 140 as described herein.

In an embodiment, the virtual peripheral hub device 112 may enable direct connection to a personal computer 138, such as via a USB port 310 or Ethernet socket 312. In this embodiment, a personal computer 138 may access peripheral devices coupled to the virtual peripheral hub device 112 as though they were connected directly to the computer.

As noted above, the virtual peripheral hub device 112 may be battery powered, powered by conventional household AC current, or powered by 12 volt DC current from an automobile (e.g., from a cigarette lighter). Thus, the power supply 308 will be configured to receive power from whatever form of external source the device is configured to receive, and configure the power as required by the processor 301 and transceiver circuitry. In battery powered implementations, the power supply 308 may also include circuitry for monitoring the charge of a battery (not shown separately) and providing charging power to the battery when the connector plug 309 is plugged into a power socket. Power supply circuitries which can perform such functions are well-known in the electronic device arts.

As described more fully herein, the virtual peripheral hub device 112 may include LEDs 334 that illuminate in different colors, such as a three color LED set which can emit yellow, green and red lights to indicate different status conditions. Such LEDs may be configured to flash or emit continuous light in response to commands from the processor 301.

Figure 3B:
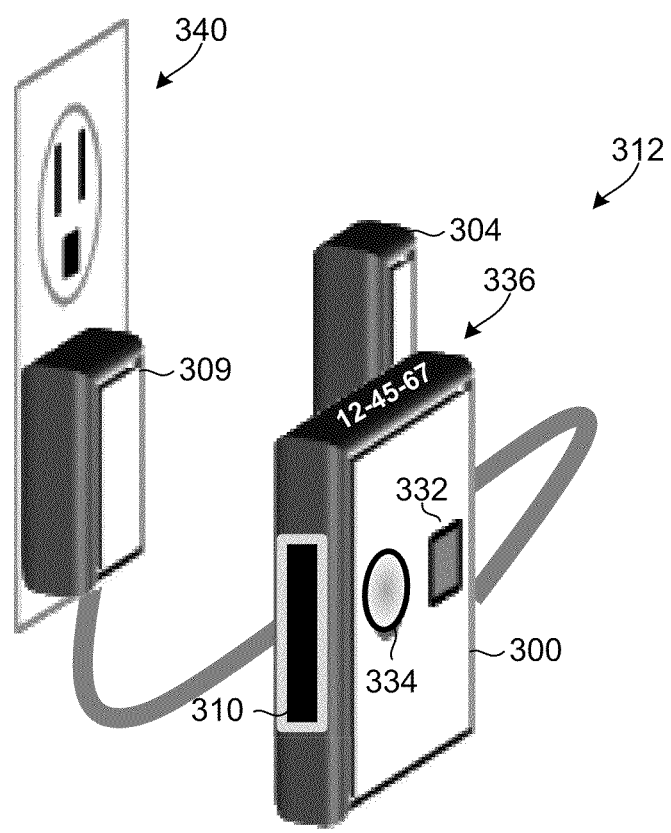
FIG. 3B is a perspective view of a virtual peripheral hub device according to an embodiment.

The virtual peripheral hub device 112 may be configured in a variety of forms. An example of a basic small device that plugs into a wall socket is illustrated in FIG. 3B. As illustrated, the virtual peripheral hub device 112 may be packaged within a compact housing 300 that exhibits a multicolor LED 334 and features a single push button 332 and one or more USB sockets 310 (and/or other sockets). A unique serial number 336 may be printed on the housing 300 to facilitate registration of the virtual peripheral hub device 112 with the VPH-server 140 as described more fully below. An antenna 304 may be provided as part of the housing 300. An electrical plug 309 may be provided as part of the case 300 or as a separate module (as shown) that is configured to plug into a standard wall socket 340. In some embodiments, the power supply 308 may be included as part of a module including the plug 309.

Figure 4:
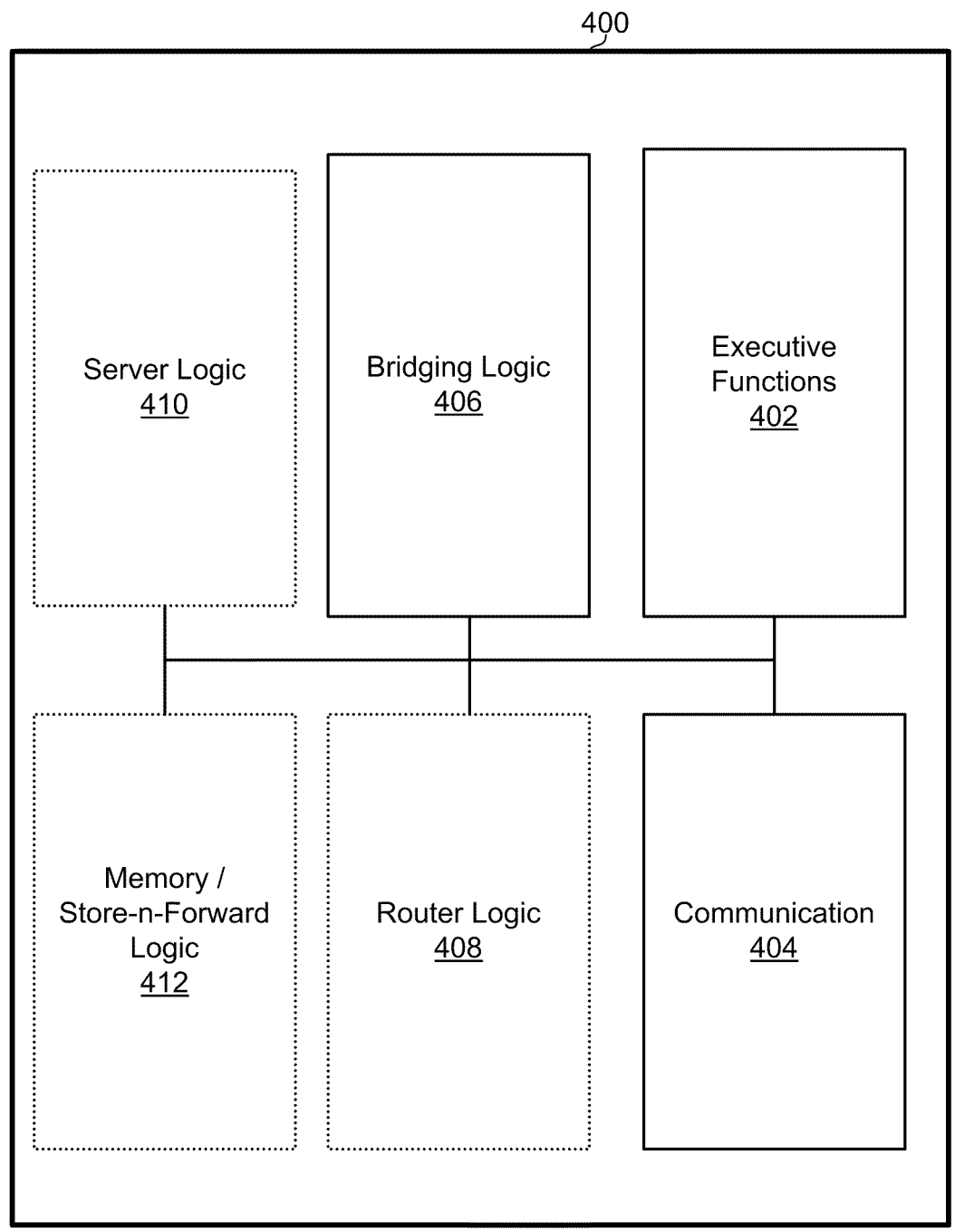
FIG. 4 is a software/hardware module block diagram of a virtual peripheral hub device according to an embodiment.

FIG. 4 illustrates functional modules that may be implemented within a virtual peripheral hub system 400 as software modules, hardware components, or combinations of hardware and software modules. A virtual peripheral hub system 400 may include executive functions 402 implemented in a processor 301 which oversee the overall processes and coordinate the other modules. A communication module 404 may include the transceivers and software for operating the transceivers as well as coordinating communication functions with the executive functions 402. The communication module 404 may include the processing necessary to comply with various communication protocols, as well as negotiating communication links, verifying data transmissions, and performing the other common functionality of digital communication systems. A bridging logic module 406 may also be coupled to the executive functions 402 and configured to perform the processes associated with providing a communication link between peripheral devices and an external computer, such as the VPH-server 140. The bridging logic module 406 may include the logic to package data received from peripheral devices into IP packets for tunneling to the VPH-server 140, for example. Similarly, the bridging logic module 406 may include the logic to unpack command packets received from the VPH-server 140 and provide the embedded commands to the appropriate peripheral device.

In various embodiments, the virtual peripheral hub system 400 may include additional modules, such as router logic 408 to enable the device to perform typical processes of a conventional router. Also, the virtual peripheral hub system 400 may include server logic 410 to enable the device to perform typical processes of a server. Further, embodiments of the virtual peripheral hub system 400 may include memory and store-and-forward logic 412 for receiving and storing data from peripheral devices and relaying that data at a later time to a destination computer. Router, server and store-and-forward processes and logic are well-known in the computer arts.

Figure 5:
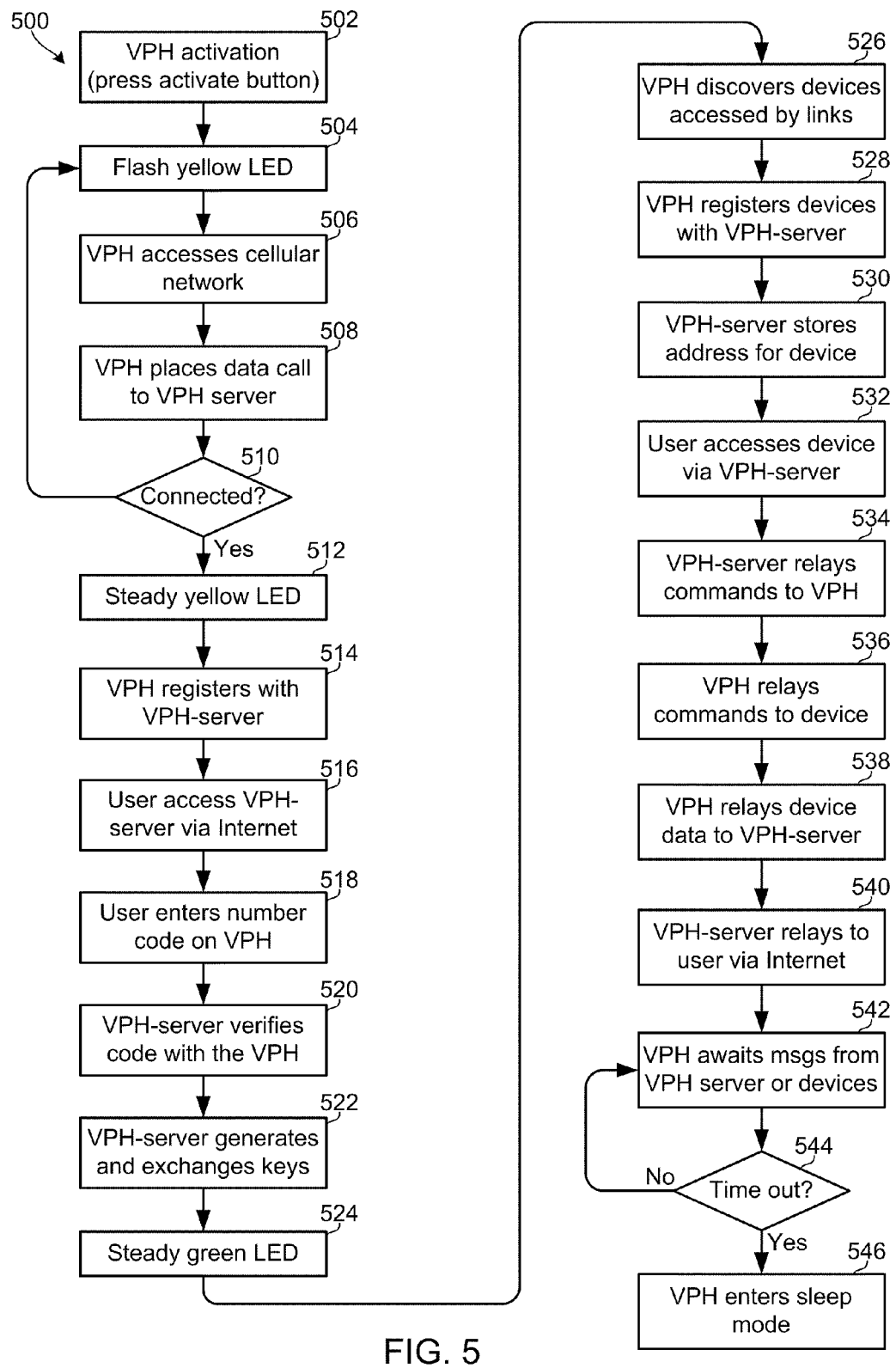
FIG. 5 is a process flow diagram of an embodiment method for initializing and utilizing a virtual peripheral hub device.

Initial configuration and some of the operations of the virtual peripheral hub are illustrated in FIG. 5 as example method 500. A beneficial characteristic of the virtual peripheral hub device system is simple, fast and reliable setup. To enable simplified setup, the virtual peripheral hub device 112 may be configured with a single button, which when pushed initiates activation. The virtual peripheral hub device 112 may also include a code 336 printed on the housing 300. The virtual peripheral hub device 112 may be pre-configured to establish wireless communication links with a cellular service (e.g., a CDMA, 3G, 4G, etc.) and communicate directly with the VPH-server 140 via the Internet 114. After pushing the activation button, a user can access an Internet web site of a VPH-server 140 and enter the device's code 336 into a webpage to identify the user as the owner of the virtual peripheral hub device 112. Thereafter, the VPH-server 140 may download any required driver software to the user's computer.

Referring to FIG. 5, the virtual peripheral hub device 112 may initiate the activation process in response to receive a press of the activation button, step 502. Alternatively, in some embodiments activation may be initiated when the device is first plugged into a power source, such as a wall socket 340. As activation begins, the virtual peripheral hub device 112 may begin to flash the LED 334, step 504. For example, the processor 301 may flash a yellow LED to indicate that the device is connecting with a cellular network. Simultaneously, the virtual peripheral hub device 112 may attempt to make a connection with a cellular data network, step 206. Once the processor determines that the transceiver 302 has established a connection to a cellular network, it may place a data call via the cellular network to the VPH-server 140, step 508. During this process the processor 301 may monitor the cellular transceiver 302 to determine if a connection has been established with the VPH-server 140, determination 510. As long as the transceiver 302 is in the process of establishing a communication link to the VPH-server 140 (i.e., determination 510="No"), the processor 301 continues to flash the yellow LED.

Once the processor determines that a communication link is established with the VPH-server 140 (i.e., determination 510="Yes"), the processor 301 may apply steady power to the yellow LED, step 510, to indicated that the registration and configuration process is underway. At the same time the processor 301 may communicate the identifier of the virtual peripheral hub device 112 to the VPH-server 140 to identify itself and register with the server, step 514. The virtual peripheral hub device may stay in this state for some pre-configured period of time (e.g., 5 minutes). During this time, the user can access the VPH-server 140 from any computer with a web browser and access to the Internet, step 516. First time users may set up an account on the VPH-server 140 by entering the number printed on the virtual peripheral hub device 112 along with a user name and password. In an embodiment, the number used to identify a virtual peripheral hub device 112 to the VPH-server 140 is a six-digit number. The VPH-server 140 validates the number entered by the user with the number provided by the virtual peripheral hub device 112 during its own online registration, step 520. If the user entered code and the code communicated by the virtual peripheral hub device 112 match, the VPH-server 140 may generate encryption and authentication keys to be used in future communications with the virtual peripheral hub device 112 and the user's computer, and transmits those keys to the device and the user's computer to complete the registration process, step 522. As part of the registration process the user's computer may download driver software that may be used to communicate with the virtual peripheral hub device 112 and/or the VPH-server 140. Such drivers may be pre-configured to enable secure communications with the specific virtual peripheral hub device 112 (i.e., the device with the same six-digit number entered into the VPH-server 140). Also as part of the registration process, the VPH-server 140 may download to the virtual peripheral hub device 112 data and software to support the various functions, such as software updates for the virtual peripheral hub device, appropriate peripheral drivers for interfacing with peripheral devices coupled to the virtual peripheral hub device, communication look up tables (e.g., updated IP addresses), etc.

Once the registration and configuration process has been completed, the processor 301 may illuminate a steady green LED, step 524, to indicate to the user that the virtual peripheral hub device 112 is registered with the VPH-server 140.

It should be noted that the registration process illustrated in FIG. 5 is but one example of how a virtual peripheral device 112 could be set up and registered with a user account maintained on a VPH-server 140. Other mechanisms for registering virtual peripheral devices 112 and correlating them with user accounts maintained on the VPH-server 140 may also be implemented. For example, the correlation of the virtual peripheral hub device 112 (e.g., based upon its six-digit number) with a user account maintained on the VPH-server 140 may be accomplished at the point-of-sale of the device. In such an implementation, the user information necessary to identify or set up a user account may be obtained by the cashier or entered by the user into the point-of-sale terminal which transmits that information along with the six-digit code to the VPH-server 140. Thus, when the user leaves the store after purchasing a virtual peripheral device, the system is ready to begin VPH services as soon as it is plugged into a wall socket and connected to peripheral devices.

Another example method for activating the virtual peripheral hub device 112 and associating it with a user VPH account may take advantage of location information from a GPS receiver that may be included in the device itself. In this implementation, when the virtual peripheral hub device 112 is activated, such as by being plugged into a wall outlet, the device determines its location from its GPS receiver 326. Upon establishing a communication link with the VPH-server 140, the virtual peripheral device 112 may inform the server of its identification code (e.g., the six-digit number printed on the housing) along with its precise latitude and longitude coordinates. Using this coordinate information, the VPH-server 140 can identify the user from public information, such as a residential address determined based upon the map coordinates, and then associate the virtual peripheral hub device 112 with a user account having the same residential address.

Once the configuration and registration process is completed, the virtual peripheral hub device 112 can be moved to any location that has cellular network connectivity. Different peripherals can be plugged into the virtual peripheral hub device 112. In an embodiment the virtual peripheral hub device 112 may discovery peripheral devices plugged into or wirelessly linked to it, step 526. As peripheral devices coupled to the virtual peripheral hub device 112 are identified, the virtual peripheral hub device 112 may identify them to the VPH-server 140, step 528, such as by transmitting their media access control (MAC) identifier (ID). The VPH-server 140 may store the peripheral device identifier in data fields associated with the user or the particular virtual peripheral hub device 112, step 530. The VPH-server 140 may also assign an IPv6 address to each peripheral device which also may be stored in the data records.

A further feature that may be included in VPH services involves downloading the driver software appropriate for particular peripheral devices to a user's computer 138. In this service, the virtual peripheral hub device 112 informs the VPH-server 140 about the connected peripheral devices during the registration and device discovery process described above. The VPH-server 140 may be configured to store driver software for most peripheral devices available in the marketplace, including historical versions of driver software that may be appropriate for older peripheral devices. Thus, when the virtual peripheral hub device 112 identifies the connected peripheral devices to the VPH-server 140, such as by providing MAC IDs of each peripheral device, the server can identify the proper driver software stored in its memory or associated database and download the appropriate drivers to a user's computer 138 when the user accesses the server. This downloading of driver software may be accomplished when the user first registers with the VPH-server 140 or associates a computer 138 with the user's account and a particular virtual peripheral device 112. Also, the VPH-server 140 may keep a data record of the MAC IDs of the attached peripheral devices and the driver software that has been downloaded to particular user computers. Using such records, the VPH-server 140 may determine when a user computer 138 requires a new or updated driver, and download the appropriate driver software when updates are received or when new peripherals are connected to the virtual peripheral device 112. In this manner, users' computers 138 can be provisioned automatically with the latest driver software required for the peripheral devices plugged into their virtual peripheral hub device 112 without having to keep track of the driver software, download the drivers themselves, or bother with the CDs containing driver software that come with peripheral devices. Thus, this VPH service can help to simplify the user experience of using a variety of peripheral devices.

As mentioned above, the virtual peripheral hub device 112 can support local network operation, such as when a user wishes to connect the virtual peripheral hub device 112 to their local network by way of an Ethernet or WiFi connection. In such embodiments, the user may provide the relevant information to the VPH-server 140 (e.g., by accessing the server via a web browser) which then configures the virtual peripheral hub device 112 using the entered information. If successful, the virtual peripheral hub device 112 can leverage the local network to access the Internet 114 and gain access to the VPH-server 140 without using a cellular data network 130. If a failure occurs in this registration process, the virtual peripheral hub device 112 may switch back to cellular connectivity and inform the VPH-server 140 that the attempt to switch to local connectivity failed. When the virtual peripheral hub device 112 is connected to a local area network or WiFi network, locally connected computers 138 can directly access the virtual peripheral hub device and peripherals coupled to it. This may be accomplished using IPv6 addresses provided by the VPH-server 140.

Additional computers can connect to the virtual peripheral hub device 112 provided they have been granted access to the virtual peripheral hub device by the user who performed the initial setup.

FIG. 5 also illustrates some normal operation processes that may be conducted once the virtual peripheral hub device 112 has been registered with the VPH-server 140. For example, a user may request access to a peripheral device from a personal computer 138 by accessing the VPH-server 140, step 532. This may be accomplished by the user accessing the VPH-server 140 via the Internet 114 from any computer hosting a web browser. Upon accessing a VPH-server webpage, the user may be prompted to enter a username and password (or some other form of user/account identification and verification). When the user is verified, the VPH-server 140 may present a menu (e.g., in the form of an HTTP webpage) of peripheral devices coupled to the virtual peripheral hub device 112, and accept a data request or configuration command for a particular peripheral device from the user's computer 138. When this data request or command is received, the VPH-server 140 may relay the data request or command to the virtual peripheral hub device 112, step 534.

In some cases, the request for data from a user's computer 138 may require the VPH-server 140 to use a driver for the particular peripheral device in order to format the data request or command so that it can be received and processed by the peripheral device. In this manner, a user may be able to access a particular peripheral device (e.g., a webcam) from any computer with Internet access, including computers that are not equipped with the appropriate device driver software. The virtual peripheral hub device 112 receives the data request recommends from the VPH-server 140 and relays them on to the particular peripheral device, step 536. In some cases the data request or command may be encapsulated within IP packets with the packet payload including the data request or command in the format required by the device driver as formatted by the VPH-server 140. In such cases, the virtual peripheral hub device 112 unpacks the data request or command and relays it to the peripheral device via the wired or wireless connection established with the device.

If a peripheral device provides data for communication to the VPH-server 140 or a user computer 138 (such as may occur in response to a data request messages discussed above), such data is received by the virtual peripheral hub device 112 and relayed to the VPH-server 140, step 538. In some cases, the virtual peripheral hub device 112 may encapsulate the device data within IP packets so that the data can be tunneled through the Internet for processing by the VPH-server 140 using an appropriate driver software. As described above, the data messages are transmitted to the Internet address of the VPH-server 140 via a cellular or local area network connection to the Internet 114. Peripheral device data packets are received by the VPH-server 140, processed if necessary, and relayed to a user computer (if appropriate) via the Internet 114, step 540.

When not actively responding to a data request or relaying data from a peripheral device, the virtual peripheral hub device 112 may await messages from the VPH-server 140 or a computer coupled to the device or to a local area network, step 542. To minimize costs associated with maintaining a data connection via a cellular data network, the virtual peripheral hub device 112 may be configured to terminate an active data connection when activity ceases for a predetermined amount of time ("timeout interval"). Thus, the processor 301 of the virtual peripheral hub device 112 may be configured to determine whether the timeout interval has transpired since a last communication event, determination 544. If the timeout interval has not expired (i.e., determination 544="No"), the virtual peripheral hub device 112 may continue to monitor the open cellular data communication link for messages from the VPH-server 140. Once the timeout interval has expired (i.e., determination 544="Yes"), the virtual peripheral hub device 112 may terminate the open cellular data communication link and enter a "sleep" mode, step 546. In embodiments in which the virtual peripheral hub device 112 is plugged into an inexhaustible power supply, such as an AC wall socket, the sleep mode may involve terminating the open cellular data communication link but continuing to monitor messages or telephone calls placed to the telephone number of the device. For example, as described more fully below with reference to FIG. 8A, the virtual peripheral hub device 112 may be configured to receive a simple message service (SMS) message during the sleep mode which prompts the device to place a data call to the VPH-server 142 initiate a new data communication link. In embodiments in which the virtual peripheral hub device 112 is battery powered, the sleep mode may further entail reducing processing performed on the device in order to economize battery consumption.

Figure 6A:
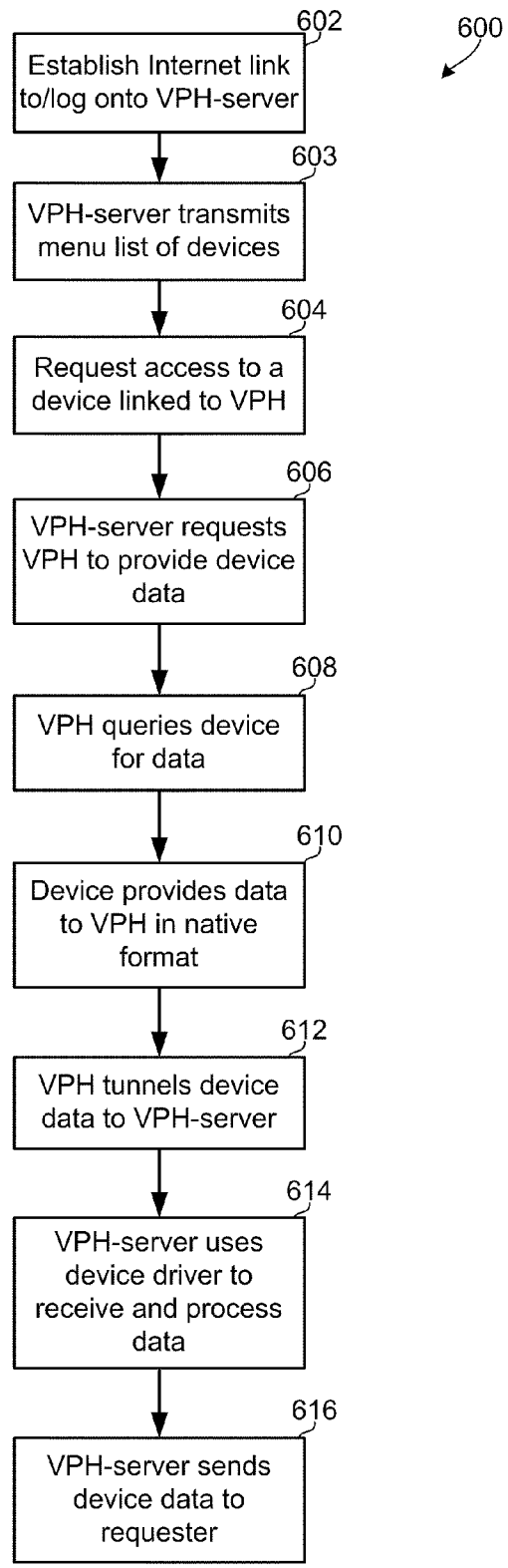
FIGS. 6A and 6B are process flow diagrams of embodiment methods for accessing a peripheral device using a virtual peripheral hub device via a virtual peripheral hub server.

As mentioned above, the virtual peripheral hub device 112 and the VPH-server 140 may be configured to communicate data in a format that does not require the virtual peripheral hub device processor 301 to run a device driver for any peripheral device. FIG. 6A illustrates an example method 600 for tunneling data and commands to and from peripheral devices via the Internet. In the example method 600, a user may access the Internet from any computer, such as from a web kiosk computer, and access the VPH-server 140 at its URL, step 602. After the user is identified and verified to the VPH-server 140, VPH-server 140 may generate a webpage listing a menu of peripheral devices coupled to the virtual peripheral hub device 112, step 603. The user may then request access to a particular peripheral device, such as a webcam 102 (e.g., to check on the user's house), step 604. This request may be accomplished, for example, by the user selecting a webcam hyperlink on the menu list of available peripheral devices listed in a webpage generated by the VPH-server 140. For example, hyperlinks may be configured so that double-clicking on a webcam hyperlink in the peripheral device menu may transmit a device access request to the VPH-server 140, or transmit a code that the VPH-server 140 will recognize as such.

In response to receiving a device or data access request from a user, the VPH-server 140 may transmit a suitable request message to the virtual peripheral hub device 112 to obtain the access or data requested by the user, step 606. Upon receiving this request, the virtual peripheral hub device 112 may query the indicated peripheral device for the requested data, step 608. In response, the queried peripheral device may begin providing the requested data in its native format (i.e., in a format that requires a device driver to receive), step 610. For example, if the request is for images from a webcam 102, the virtual peripheral hub device 112 may signal the webcam 102 to activate and begin transmitting image data to the virtual peripheral hub device 112. The virtual peripheral hub device 112 receives the peripheral device data and packages the data into IP packets that can be tunneled via the Internet 114 to the VPH-server 140, step 612. Methods and protocols for tunneling data via the Internet are well-known in the computer communication arts.

The VPH-server 140 receives message packets from the virtual peripheral hub device 112, unpacks the device data from the tunneling IP packets, and uses the appropriate driver software to process the received device data, step 614. The VPH-server 140 may then transmit the requested data on to the requester's computer via the Internet 112 using standard IP formats, such as in the form of a webpage or video feed, step 616. Thus, in the example of a user requesting access to video images from a webcam 102 coupled to the virtual peripheral hub device 112, the user may receive a video feed presented on a web browser without having to load the webcam driver software onto the computer.

Figure 6B:
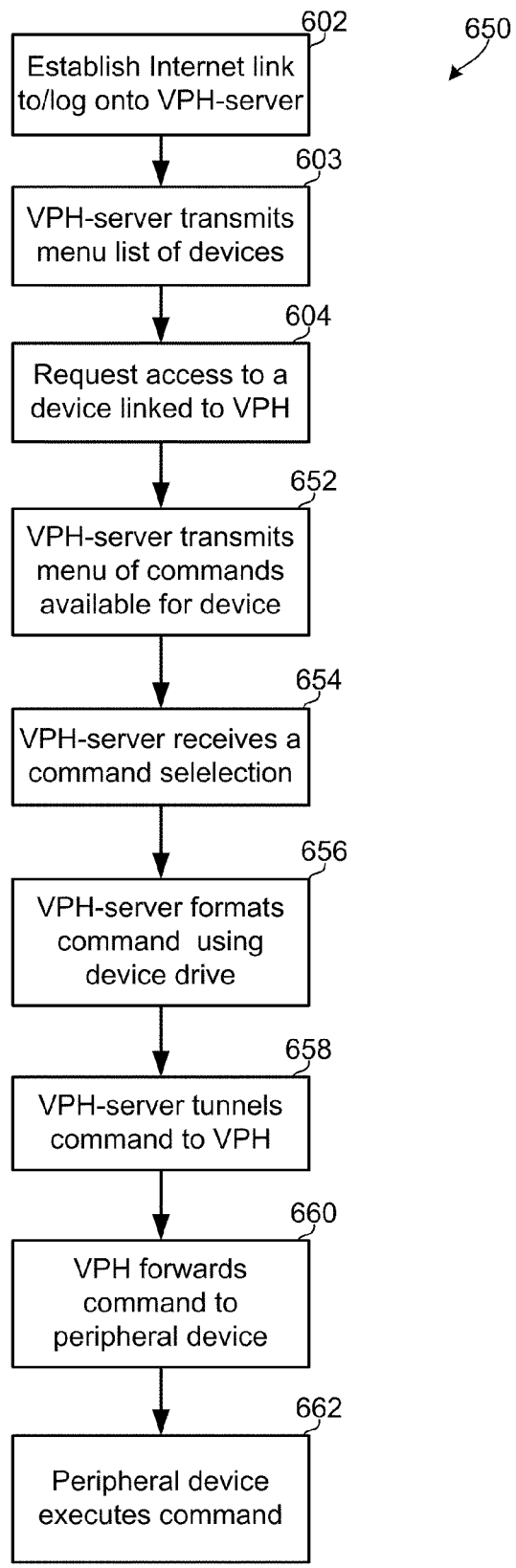

The tunneling of data and commands may also proceed from a user's computer via the VPH-server 140 to the virtual peripheral hub device 112. For example, a user may be able to operate or configure a peripheral device from a web kiosk computer (i.e., a computer that does not is not equipped with the appropriate device driver) using the VPH services. An example embodiment method 650 for tunneling command messages to a peripheral device via the virtual peripheral hub device 112 is illustrated in FIG. 6B. A user may access the Internet from any computer, such as from a web kiosk computer, and access the VPH-server 140 at its URL, step 602. After the user is identified and verified to the VPH-server 140, the VPH-server 140 may generate a webpage listing a menu of peripheral devices coupled to the virtual peripheral hub device 112, step 603. The user may then request access to a particular peripheral device, such as a security system 104 (e.g., to remotely set a particular alarm state), step 604. This request may be accomplished by the user selecting a webcam hyperlink on the menu list of available peripheral devices listed in a webpage generated by the VPH-server 140. For example, double-clicking on a security system hyperlink in the peripheral device menu may be configured as a device access request that is transmitted to the VPH-server 140. If the selected device will accept user commands, the VPH-server 140 may transmit a webpage presenting a menu of the commands available for the selected peripheral device, step 652. The user may select a particular command, such as by clicking on a hyperlink associated with the command description, the user can signal the VPH-server 140 to send the corresponding command to the selected peripheral device via the virtual peripheral hub device 112. Upon receiving such a command request, step 654, the VPH-server 140 may format the requested command using the appropriate device driver software, step 656, and encapsulate the command within IP message packets so that it will be tunneled through the Internet 114 to the virtual peripheral hub device 112, step 658. Upon receiving such IP packets, the virtual peripheral hub device 112 unpacks the command data and transmits the command packets to the addressed peripheral device, step 660. The peripheral device receives and executes the command as if it had been provided directly by a computer linked to the device and configured with the appropriate device driver, step 662.

Figure 7A:
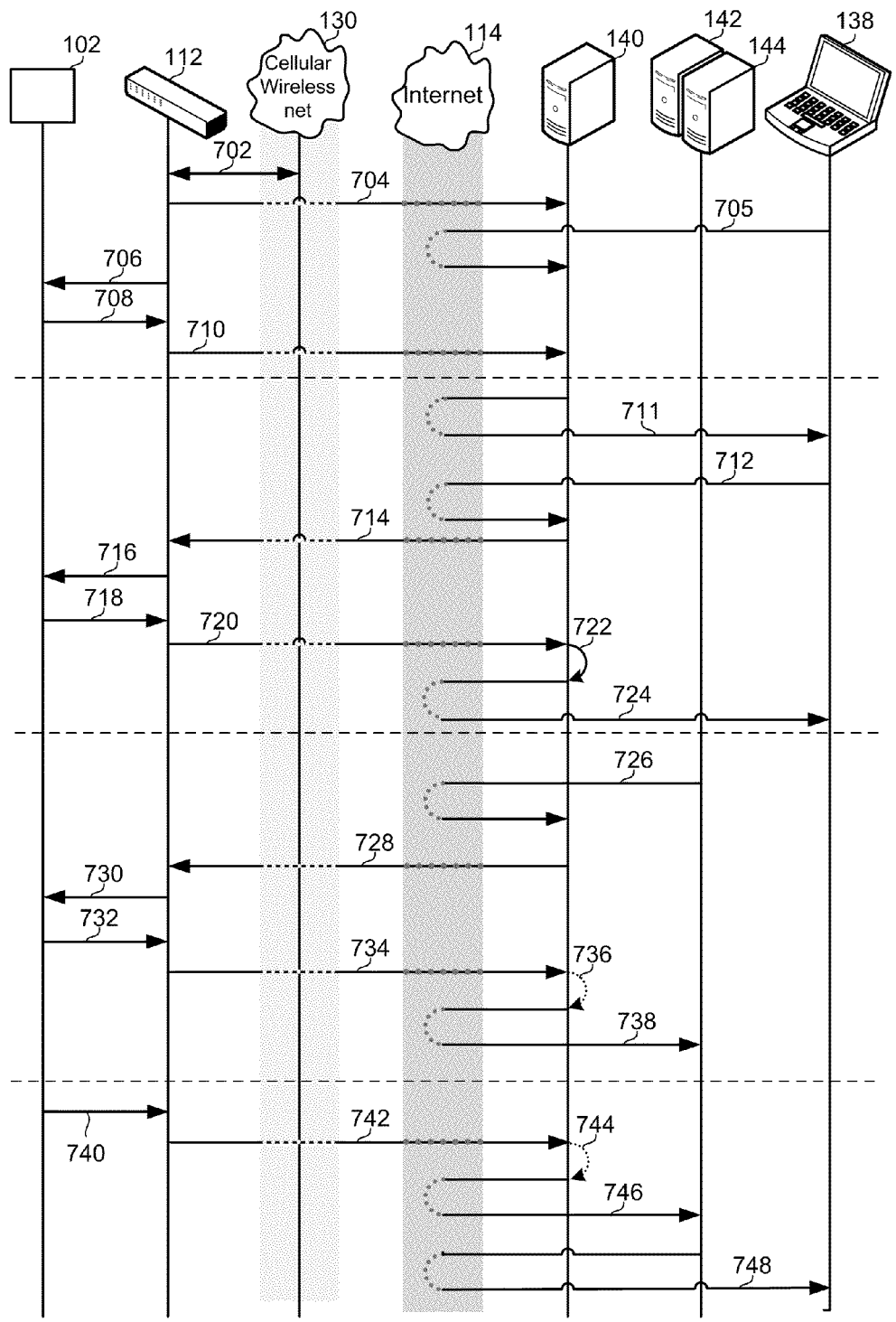
FIG. 7A-7B are message flow diagrams illustrating messages that may be exchanged among various components during various operations of an embodiment virtual peripheral hub device.
Figure 7B:
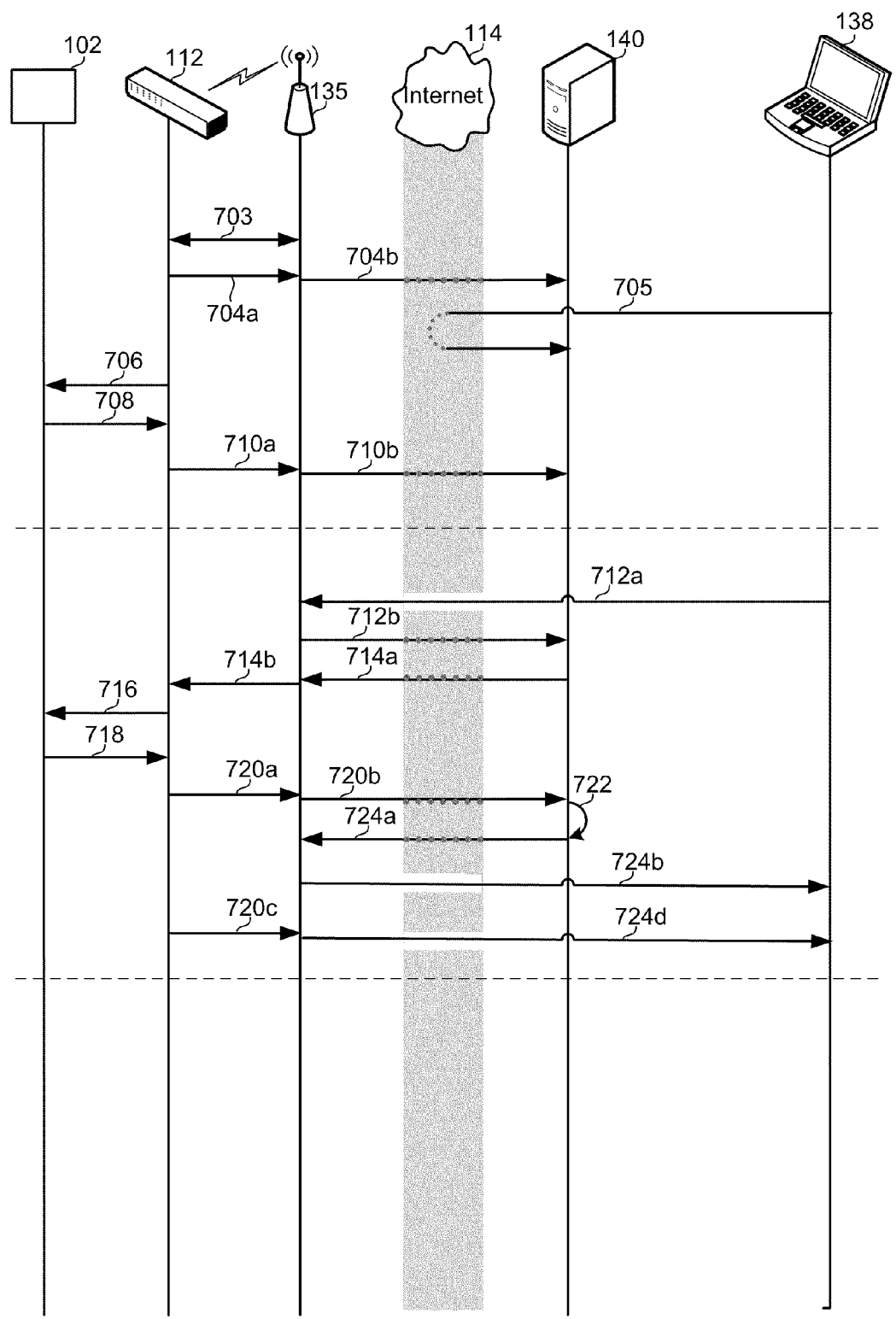

Example message flows the may be implemented in the various embodiment methods are illustrative in FIGS. 7A and 7B. Referring to FIG. 7A, when the virtual peripheral device 112 is activated, such as when it is plugged into a wall socket and the user presses the initiation button, the device may exchange the network signaling messages 702 necessary to establish a cellular data communication link with a cellular wireless network 130. Once connected to the cellular wireless network 130, the virtual peripheral hub device 112 may establish a data call to the VPH-server 140 and transmit the device's identifier, message 704. As described above, the virtual peripheral hub device 112 may signal to a user when a connection is made to the VPH-server 140, such as by displaying a steady yellow light, at which point the user may log into the VPH-server 140 via the Internet 114 and enter registration information (e.g., as the six-digit number on the housing of the virtual peripheral hub device), message 705. Once the virtual peripheral hub device 112 is registered with the VPH-server 140, it may discover the peripheral devices 102 coupled to it, such as by transmitting device discovery messages 706 and receiving device reply messages 708. Device discovery and reply message formats are well-established in networking protocols, such as the Bluetooth® protocol. As the virtual peripheral hub device 112 identifies attached peripheral devices, it may transmit information regarding them, such as their MAC ID, to the VPH-server 140, message 710.

Once the registration process is completed, a user may access a peripheral device 102 from a computer 138 by logging on to the VPH-server 140. As discussed above, the VPH-server 140 may send a webpage to the browser of the user's computer 138 presenting a menu of peripheral devices 102 that may be accessed, message 711. Using such a menu or a direct command, the user may request access to a particular peripheral device by sending an access request message 712 to the VPH-server 140 via the Internet 114. In response to receiving this message, the VPH-server 140 may transmit an appropriate data request message 714 over the open data communication link with the virtual peripheral hub device 112 via the Internet 114 and the cellular wireless network 130. The virtual peripheral hub device 112 relays the data request message 716 to the selected peripheral device 102. Data generated in response to the request may be transmitted from the peripheral device 102 to the virtual peripheral hub device 112 via the established cable or wireless communication link, message 718. The virtual peripheral hub device then relays the data, such as in an encapsulated IP packet to the VPH-server 140 over the open data communication link via the cellular wireless network 130 and the Internet 114, message 720. The VPH-server 140 may unpack the device data and process it using the appropriate device driver software, processing 722, and forward the data on to the requesting computer 138 via the Internet 114, message 724.

As mentioned above, other data users, such as medical establishments or device manufacturers, may request data from peripheral devices coupled to the virtual peripheral hub device 112. To do so, a server 142, 144 controlled by the data user may transmit a data request message via the Internet 114 to the VPH-server 140, message 726. If the VPH-server 140 does not have the requested data in memory, it may transmit a data request message 728 to the virtual peripheral hub device 112. The virtual peripheral hub device 112 relays the data request message 730 to the selected peripheral device 102. Data generated in response to the request may be transmitted from the peripheral device 102 to the virtual peripheral hub device 112 via the established cable or wireless communication link, message 732. The virtual peripheral hub device then relays the data, such as in an encapsulated IP packet, to the VPH-server 140 over the open data communication link via the cellular wireless network 130 and the Internet 114, message 734. The VPH-server 140 may unpack the device data and process it using the appropriate device driver software, optional processing 736, and forward the data on to the requesting server 142, 144 via the Internet 114, message 738. In situations where the VPH-server 140 does not possess the device driver for the particular peripheral device, such as when the data requester controls device drivers, the VPH-server 140 may simply relay the encapsulated device data without processing.

The VPH services may be configured to deliver data generated by a peripheral device 102 without receiving a data request message. For example, a peripheral device 102, such as a home security system, may generate a data message 740 that is transmitted to the virtual peripheral hub device 112 by an establish communication link (e.g., a USB or FireWire cable or local wireless communication link). In response to receiving such a data message 740, the virtual peripheral hub device 112 may place a data call to the VPH-server 140 and transmit the data via the cellular data network 130 and the Internet 114, message 742. The VPH-server 140 may unpack the device data and process it using the appropriate device driver software, optional processing 744, and forward the data on to the appropriate destination computer, such as a server 142, 144 via the Internet 114 in message 746, or to a user computer 138 via the Internet 114 in message 748. In situations where the VPH-server 140 does not possess the device driver for the particular peripheral device, such as when the data generating peripheral device is controlled by the manufacturer, the VPH-server 140 may simply relayed the encapsulated device data without processing.

As mentioned above, the virtual peripheral hub device 112 may also be configured to communicate with the VPH-server 140 via a connection to the Internet 114 through a local wireless router 135. Example messages that may be transmitted among various components in such a communication system are illustrated in FIG. 7B. For example, during the registration and configuration process described above with reference to FIG. 5, the virtual peripheral hub device 112 may discover that it can gain access to the Internet 114 via a wireless router 135. In that case, the virtual peripheral hub device 112 may establish a wireless communication link with the router 135 in an exchange of messages 703 as provided for in the wireless protocol implemented by the router. Once connected to the router, the virtual peripheral hub device 112 may transmit its identification number (e.g., a unique six-digit) to the VPH-server 140 via the wireless router 135, message 704*a*, which may relay the message via the Internet 114, message 704*b*. Similarly, the virtual peripheral hub device 112 may transmit information about attached peripheral devices 102 in a wireless message 710*a* to the wireless router 135 which may relay the message via the Internet 114 to the VPH-server 140, message 710*b*. Other like numbered messages may be exchanged in the manner described above with reference to FIG. 7A.

FIG. 7B also illustrates message flows of communications between a user's personal computer 138, the virtual peripheral hub device 112 and peripheral devices 102 when a local wireless router 135 is available. When a user's personal computer 138 is coupled to the wireless router 135, it may log in to the VPH-server 140 with access message 712*a* sent to the wireless router 135. The wireless router 135 may relay the access message from the personal computer 138 to the VPH-server 140 via the Internet 114, message 712*b*. Messages from the VPH-server 140 to the virtual peripheral hub device 112 may be communicated via the Internet 114 to the wireless router 135, messages 714*a*, which may relay them to the virtual peripheral hub device 112, messages 714*b*. Similarly, messages relaying data from peripheral devices 102 may be transmitted from the virtual peripheral hub device 112 to the wireless router 135, messages 720*a*, which routes them onto the VPH-server 140 via the Internet 114, messages 720*b*. The VPH-server 140 may process the data, processing 722, and forward the data on to the personal computer 138 by transmitting data messages via the Internet 114 to the wireless router, message 724*a*, which relays the messages to the personal computer 138, message 724*b*. As mentioned above, the virtual peripheral hub device 112 may also be configured to communicate directly with the personal computer 138 via a local network. Thus, messages from the virtual peripheral hub device 112 may be sent to the personal computer 138 via the wireless router 135, message 720*c*, which may relay the messages directly to the personal computer 138, message 724*d*.

Figure 8A:
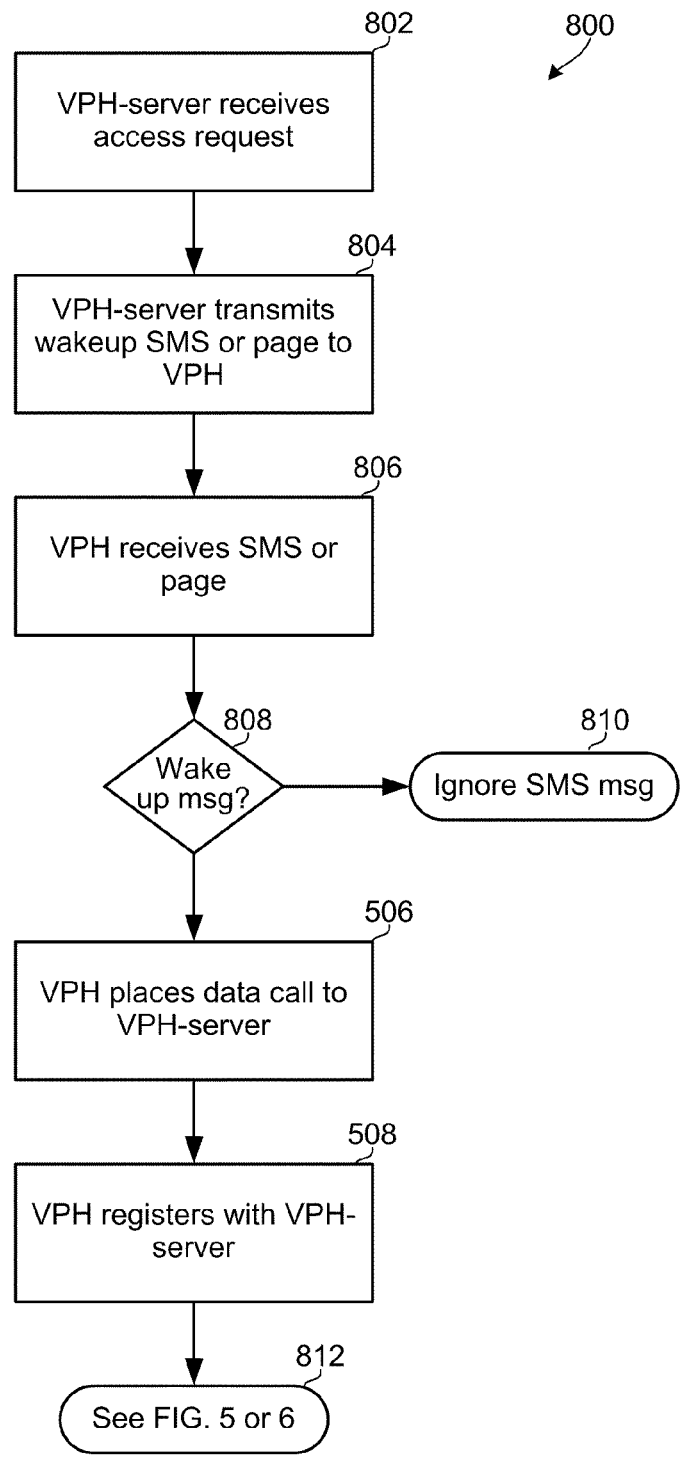
FIG. 8A is a process flow diagram of an embodiment method for activating a virtual peripheral hub device from a low-power mode.
Figure 8B:
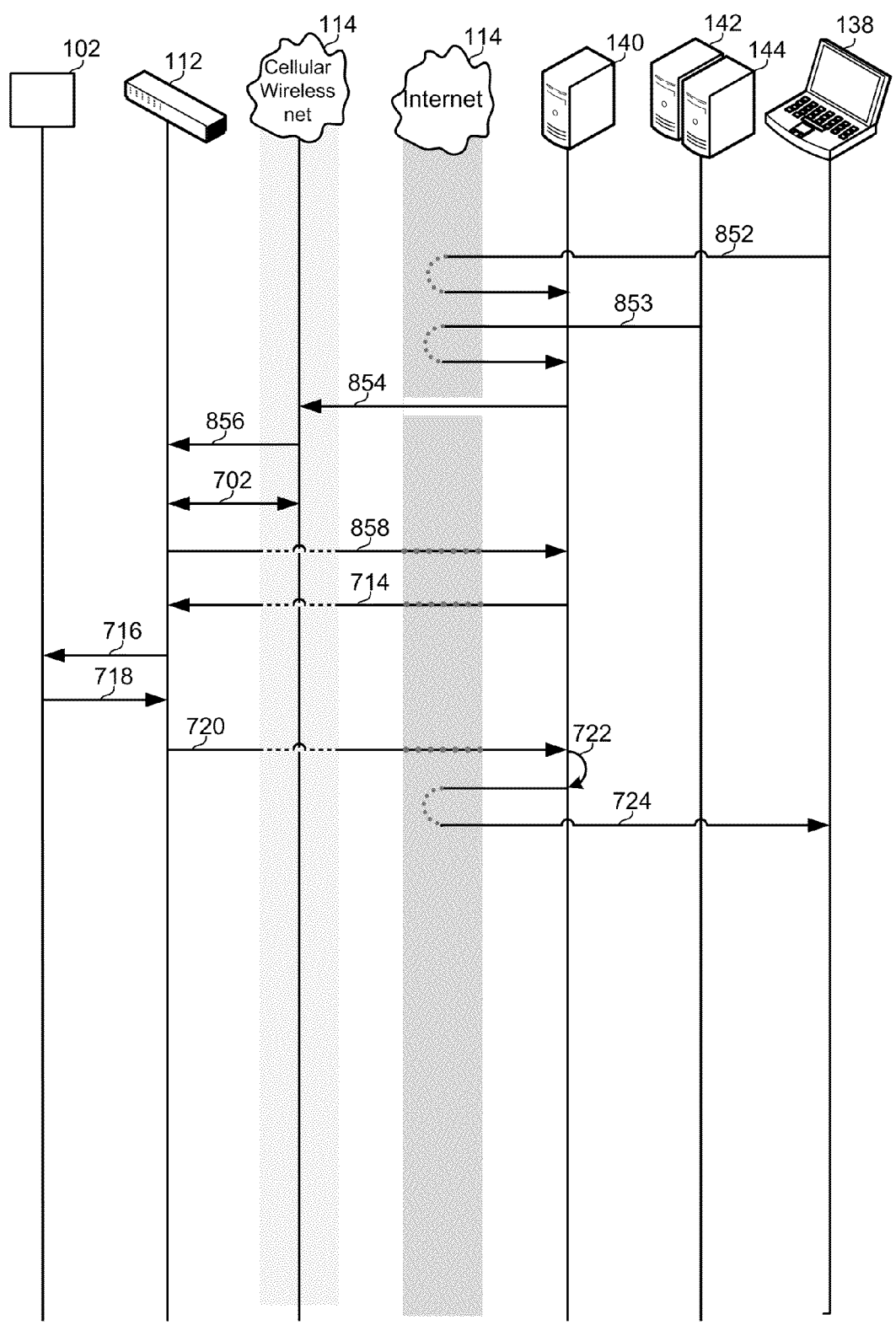
FIG. 8B is a message flow diagram illustrating messages that may be exchanged among various communication network participants during the embodiment method illustrated in FIG. 8A.

As described above, the virtual peripheral hub device 112 may be configured to enter an idle or "sleep mode" when there are no active interactions with peripheral devices or with the VPH-server 140. The purpose of such a sleep mode may be to minimize the operating cost of the virtual peripheral hub, such as by minimizing cellular network access charges when no active data communications are taking place. In such an implementation, the VPH-server 140 may be configured to send a message to the virtual peripheral hub device 112 to "wake it up" when there is a need to communicate with the peripheral devices. An example method 800 for accomplishing this is illustrated in FIG. 8A and example messages that may be exchanged in the process are illustrated in FIG. 8B. Referring to FIGS. 8A (for steps) and 8B (for messages), when the VPH-server receives a request for data or access to a particular peripheral device coupled to a virtual peripheral hub device 112, step 802 and messages 852, 853, the VPH-server may transmit a wake-up message to the virtual peripheral hub device 112, step 804. Such a wake-up message may be transmitted as an SMS message which may be sent by conventional means to the cellular data network 130, message 854, which may deliver the message like a conventional SMS message, message 856. Such an SMS message may be addressed to a telephone number assigned to the virtual peripheral hub device 112 and include data or codes which the virtual peripheral hub device can recognize as constituting a wake-up message. Alternatively, the VPH-server 140 may send a paging-type message to the virtual peripheral hub device 112 which may be configured with a paging receiver.

When the virtual peripheral hub device 112 receives the SMS or page message, step 806, the device processor 301 may parse the received message to determine whether it includes a code indicating that the virtual peripheral hub device 112 should wake-up, determination 808. If the received message does not include the appropriate "wakeup code" (i.e., determination 808="No"), the processor 301 may simply ignore the received message, step 810. This test of the received code can guard against inadvertent activations of the virtual peripheral hub device 112, such as when a message is improperly routed or a wrong number is dialed.

If the processor 301 determines that the received message includes the appropriate "wakeup code" (i.e., determination 808="Yes"), the virtual peripheral hub device 112 may activate its cellular transceiver 303 to exchange the network signaling messages 702 necessary to establish a cellular data communication link with a cellular wireless network 130. If a local wireless router 135 with access to the Internet 114 is available, the virtual peripheral hub device 112 may negotiate a communication link with the wireless router instead. Once connected to the cellular wireless network 130 (or a wireless router 135), the virtual peripheral hub device 112 may place a data call to the VPH-server 140, step 506. When a connection to the VPH-server 140 is established (or as part of establishing the connection), the virtual peripheral hub device may provide its unique identifier to the server, thereby identifying itself, step 508 and message 858. With a communication link established between the virtual peripheral hub device 112 and the VPH-server 140, the server and devices may proceed with communications as described above with reference to FIGS. 5, 6A, 6B and 7A, step 812.

Additional methods for activating a computing device such as the virtual peripheral hub device are disclosed in U.S. patent application Ser. No. 12/430,642 entitled "Apparatus and Method for Activating Computer Applications with SMS Messaging" filed Apr. 27, 2009, the entire contents of which are hereby incorporated by reference.

Figure 9A:
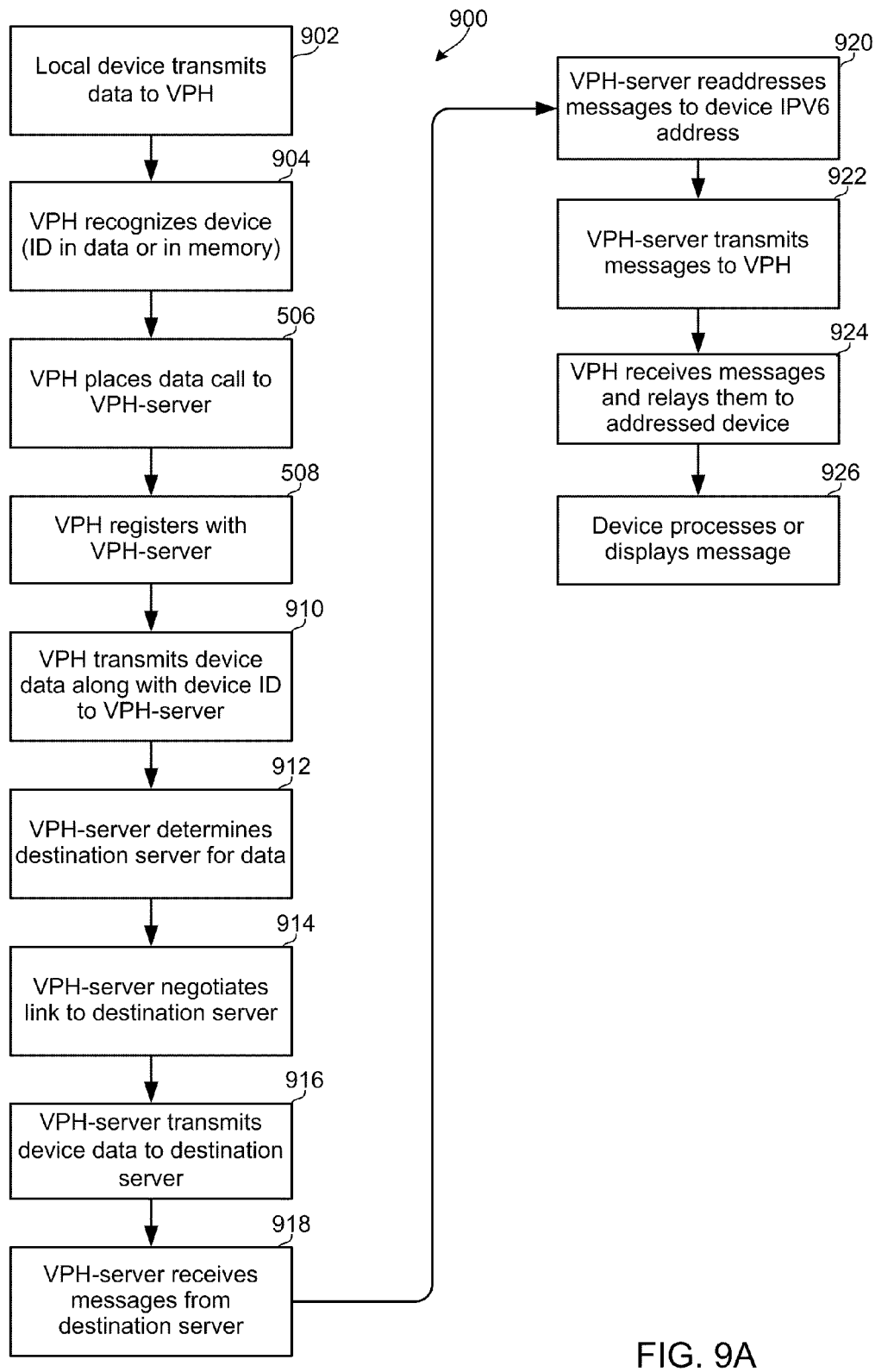
FIG. 9A is a process flow diagram of an embodiment method implemented in a virtual peripheral hub device for reporting data received from a peripheral device.
Figure 9B:
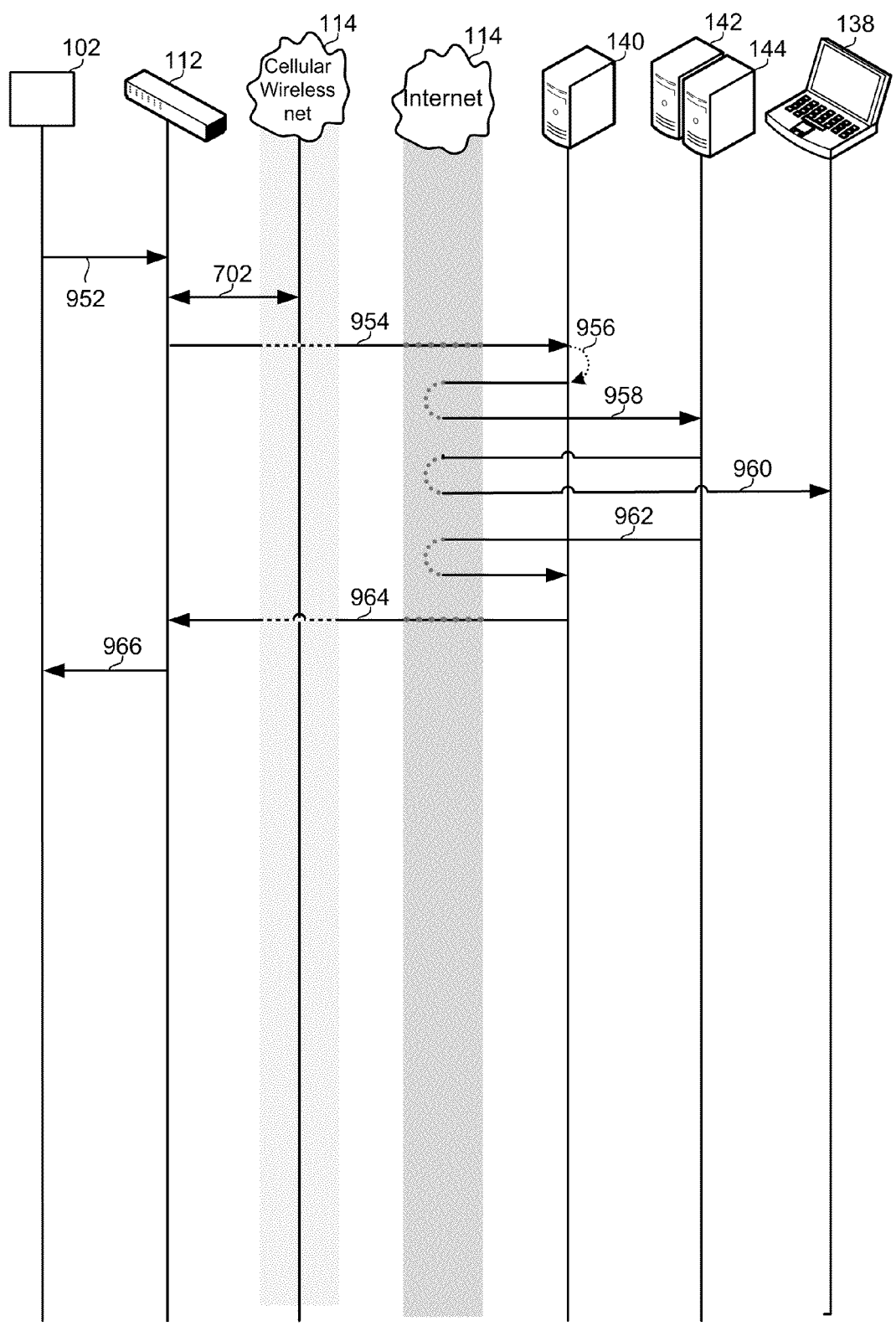
FIG. 9B is a message flow diagram illustrating messages that may be exchanged among various communication network participants during the embodiment method illustrated in FIG. 9A.

A virtual peripheral hub device 112 that is in an idle or sleep mode may also be activated in response to receiving a data message from a connected peripheral device. FIG. 9A illustrates an example method 900 for communicating data to data users initiated by a peripheral device data push. Example messages that may be passed among system components in method 900 are illustrated in FIG. 9B. Referring to FIGS. 9A (for steps) and 9B (for messages), when a peripheral device 102 determines that it has data that should be transmitted to an appropriate data user (e.g., a medical facility, a device manufacturer, a user, etc.) it may transmit the data to the virtual peripheral hub device 112 via the established communication connection 6, 8, 10, step 902 and message 952. Upon receiving the data message, the virtual peripheral hub device 112 may recognize the particular peripheral device providing the data, step 904. This may be accomplished based upon the particular communication port through which the data signal was received or information provided with the data message, such as a device identifier. As part of this step, the virtual peripheral hub device processor 301 may obtain the IPv6 address, MAC ID or other unique identifier for the reporting peripheral device that is known to be VPH-server 140 (i.e., the identifier that was reported to the server during a registration and configuration process). If a data connection is not already established with a cellular data network 130, the virtual peripheral hub device 112 may activate the cellular transceiver 303 and exchange the network signaling messages 702 necessary to establish a cellular data communication link with the cellular wireless network 130. If a local wireless router 135 with access to the Internet 114 is available, the virtual peripheral hub device 112 may negotiate a communication link with the wireless router instead. Once connected to the cellular wireless network 130 (or a wireless router 135), the virtual peripheral hub device 112 may place a data call to the VPH-server 140, step 506. When a connection to the VPH-server 140 is established (or as part of establishing the connection), the virtual peripheral hub device may provide its unique identifier to the server, thereby identifying itself, step 508. Once the virtual peripheral hub device 112 has registered with the VPH-server 140 it may transmit the data received from the peripheral device 102, step 910 and message 954. The data message transmitted in step 910 and message 954 also includes the identifier for the device providing the data. The VPH-server 140 may use the peripheral device identifier to determine the appropriate processing and destination for the data, step 912 and processing 956. If the data is to be transmitted immediately to another destination, such as a medical or device manufacturer server 142, 144, the VPH-server 140 may contact the appropriate server and negotiate an appropriate encrypted communication link via the Internet 114, step 914. Once an appropriate communication link is established, the VPH-server 140 may transmit the received device data to the destination server 142, 144 via the Internet 114, step 916 and message 958. The server 142, 144 receiving the data may then process or use the data for other purposes, such as transmitting a notification message to the user's personal computer 138 via the Internet 114, message 960.

As noted above, the VPH services are two-way, enabling data users to also transmit commands or messages back through the virtual peripheral hub device 112 to selected peripheral devices. This may involve a data user server 142, 144 transmitting a message 962 addressed to a particular peripheral device to the VPH-server 140, which receives the message via the Internet 114, step 918. The VPH-server re-addresses the message to the particular peripheral device IPv6 address, step 920, and transmits the message to the virtual peripheral hub device 112 via the Internet 114, step 922 and message 964. The virtual peripheral hub device receives the messages and relays them onto the addressed the peripheral device, step 924 and message 966. The addressed peripheral device then processes or displays the message, step 926.

A practical implementation example may clarify the processing described above with reference to FIGS. 9A and 9B. Since sudden weight gain can be an indicator of some serious medical conditions, providing such information to a medical facility may be useful for advising patients when they need to take medication or see a doctor immediately. To enable such early warning with minimal effort by patients, an electronic bathroom scale may be configured as a peripheral device with a wireless (or wired) transceiver that couples to a virtual peripheral hub device 112 to transmit weight readings whenever a user starts on the scale. The scale, the virtual peripheral hub device 112, and/or the VPH-server 140 may be configured (e.g., as part of a registration process) to promptly forward scale readings to a medical facility server 142 that is tracking a patient's weight. When a user steps on the scale, the weight reading may be automatically transmitted to a destination server that can process the information without any action or involvement on the part of the user. If the medical facility server 142 detects a sudden change in weight that may indicate a condition requiring a medical intervention (e.g., taking a medication or visiting a doctor), the server may transmit a message to be displayed on an appropriate peripheral device that the user is likely to see. Thus, the medical facility server 142 may transmit a message using the VPH services so that it is receives by a peripheral device, such as a LCD display, a digital picture frame, or other device with a display informing the user to take the proper precautions.

Figure 9C:
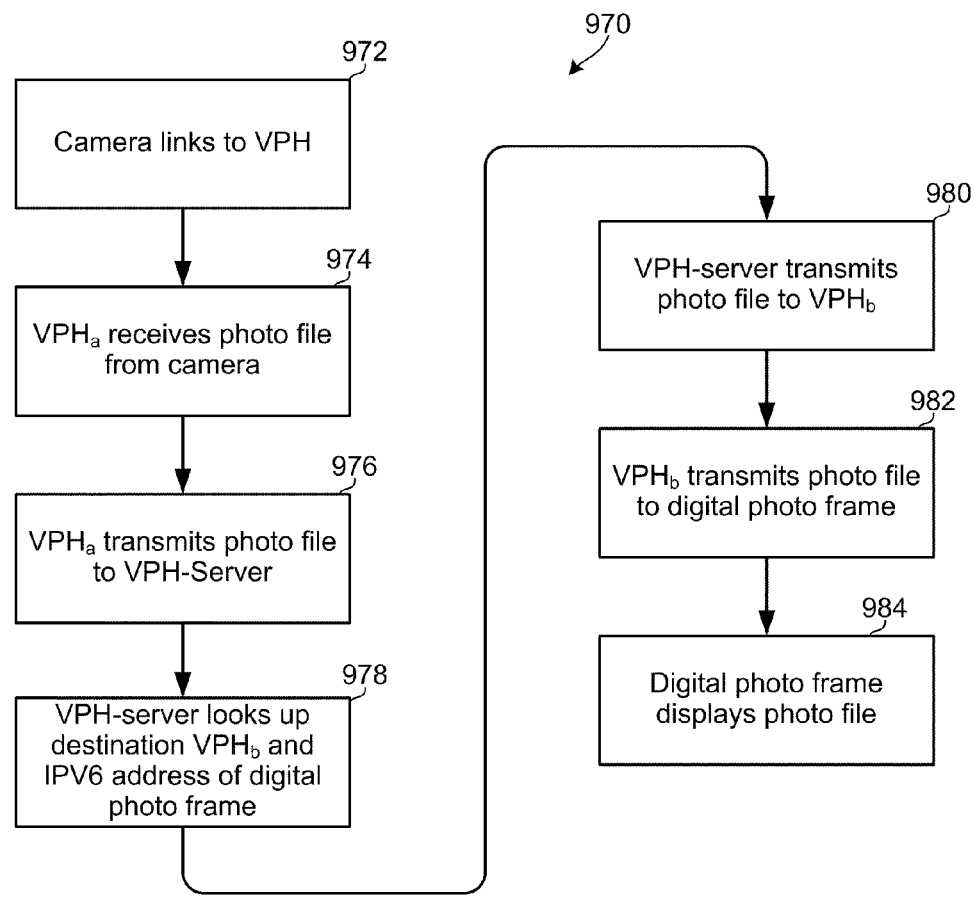
FIG. 9C is a process flow diagram of an embodiment method implemented in a virtual peripheral hub device for transmitting data received from a peripheral device to another peripheral device coupled to another virtual peripheral hub device.
Figure 9D:
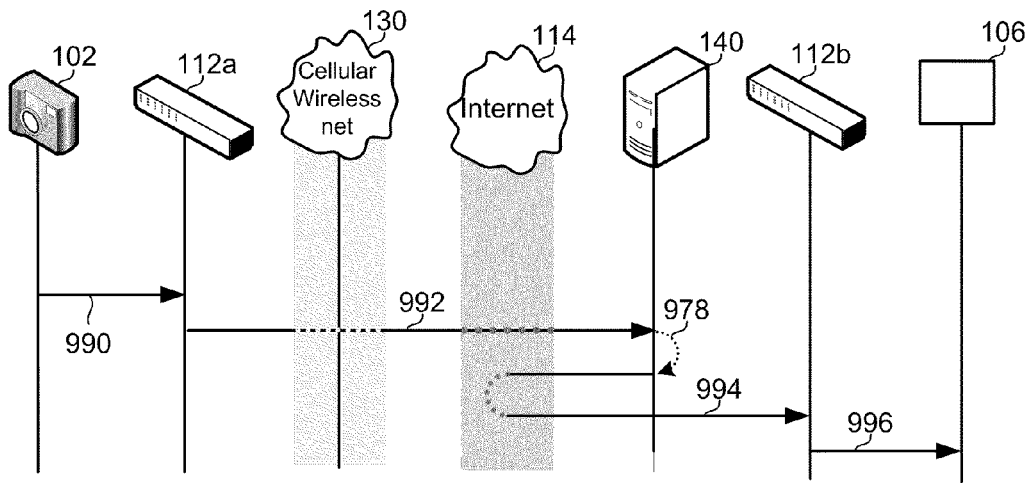
FIG. 9D is a message flow diagram illustrating messages that may be exchanged among various communication network participants during the embodiment method illustrated in FIG. 9C.

Another example of useful applications of VPH services is the automatic distribution of digital camera images as illustrated in FIGS. 9C and 9D. A common problem faced by owners of digital cameras is the efficient distribution of their photos to their friends and family. A recent innovation that is useful in this regard is a digital photo frame which includes a LCD display coupled to memory for storing digital photos. Some digital photo frames are equipped to connect to a network so that downloading images can be accomplished very simply. However, many of the potential purchasers of digital photo frames may lack the technical savvy to install a home network and couple it to a digital photo frame. The virtual peripheral hub device 112 and the associated VPH services can rectify the challenges of connecting a digital photo frame to the Internet so that users may easily receive photos from their friends and family without having to become masters of computer networking technologies.

Referring to FIGS. 9C (for steps) and 9B (for messages), a user who has taken photographs may link their digital camera to a virtual peripheral hub device 112 such as by means of a USB cable, FireWire cable or a local wireless connection (e.g., a Bluetooth® wireless link), step 972. Once connected, the virtual peripheral hub device may receive a photo file from the camera (e.g., that has been designated for sharing), step 974 and message 990. The virtual peripheral hub device 112*a* may establish a link to the VPH-server 140 and transmit the received photo file, step 976 and message 992. The VPH-server 140 may be configured (e.g., by user preference settings established in an online session) to forward photo files to a particular destination, such as an IPv6 address of a digital photo frame. Thus, the VPH-server 140 may use the identifier for the virtual peripheral hub device 112*a* to look up the appropriate destination for a received photo file (e.g., the IPv6 address of the digital photo frame), step 978, and transmit the photo file via the Internet 114 to the virtual peripheral hub device 112*b* coupled to the destination peripheral device 106, step 980 and message 994. The receiving virtual peripheral hub device 112*b* relays the received photo file to the destination digital photo frame 106, step 982 and message 996, and the digital photo frame may display the photo, step 984.

The VPH-server 140 may implement well known data structures in order to support the VPH services of the various embodiments, an example of which is shown in FIG. 10. For example, the VPH-server 140 may maintain a database of user accounts 1000 which the server can use to associate particular users with particular virtual peripheral hub devices and connected peripheral devices. Such a data structure 1000 may comprise a plurality of data records (shown as rows) each comprising a plurality of data fields 1002-1014. For example, a data field 1002 may be provided for storing the unique identifier for the virtual peripheral hub devices, and a data field 1004 may be provided for storing a user identifier (e.g., a user account number or user name). The data structure 1000 may also include a data field 1006 for storing an IP address that the VPH-server 140 can use to send messages to the virtual peripheral hub device 112 via the Internet 114. Further, the data structure 1000 may include a plurality of data fields for each peripheral device plugged into the virtual peripheral hub, including such information as a device IPv6 address (data field 1008), a device ID (data field 1010), one or more data fields for storing device data (data field 1012), and a URL (or other type of address) to which data received from a device should be forwarded (data field 1014). Using such a data table, a VPH-server 140 receiving a message including a virtual peripheral hub device identifier can quickly locate the data record associated with a particular device, and thereby determine the associated user and its connected peripheral devices. Similarly, a VPH-server 140 accessed via the Internet by a user providing a user name or user account number can quickly locate the data record associated with the user, and thereby may determine the associated virtual peripheral hub device, its address and the peripheral devices plugged into it.

The virtual peripheral hub device 112 may also be configured with memory for storing peripheral device data in a data structure 1100. The virtual peripheral hub device 112 may use such a data structure to determine whether to report received device data promptly or to store the data temporarily for later forwarding to the VPH-server. For example, the data structure 1100 may include a data record for each peripheral device plugged into the virtual peripheral hub device 112, with each data record comprising a plurality of data fields 1102-1114. For example, the data structure 1100 may include a data field 1102 for storing the peripheral device identifier (e.g., MAC ID), a data field 1104 for storing information regarding the communication port coupled to that particular peripheral device, a data field 1106 for storing an IPv6 address assigned to the peripheral device, a data field 1108 for storing information regarding how the virtual peripheral hub device should treat the data (e.g., whether to promptly report received data or not), a data field 1110 for storing the date and time of the last data received from the device, a data field 1112 for storing the last time that data from the peripheral device was transmitted to the VPH-server 140, and one or more data fields 1114 for storing data received from the peripheral device. Using such a data structure 1100, the virtual peripheral hub device 112 can be configured to support a wide variety of data management services for connected peripheral devices.

Figure 12:
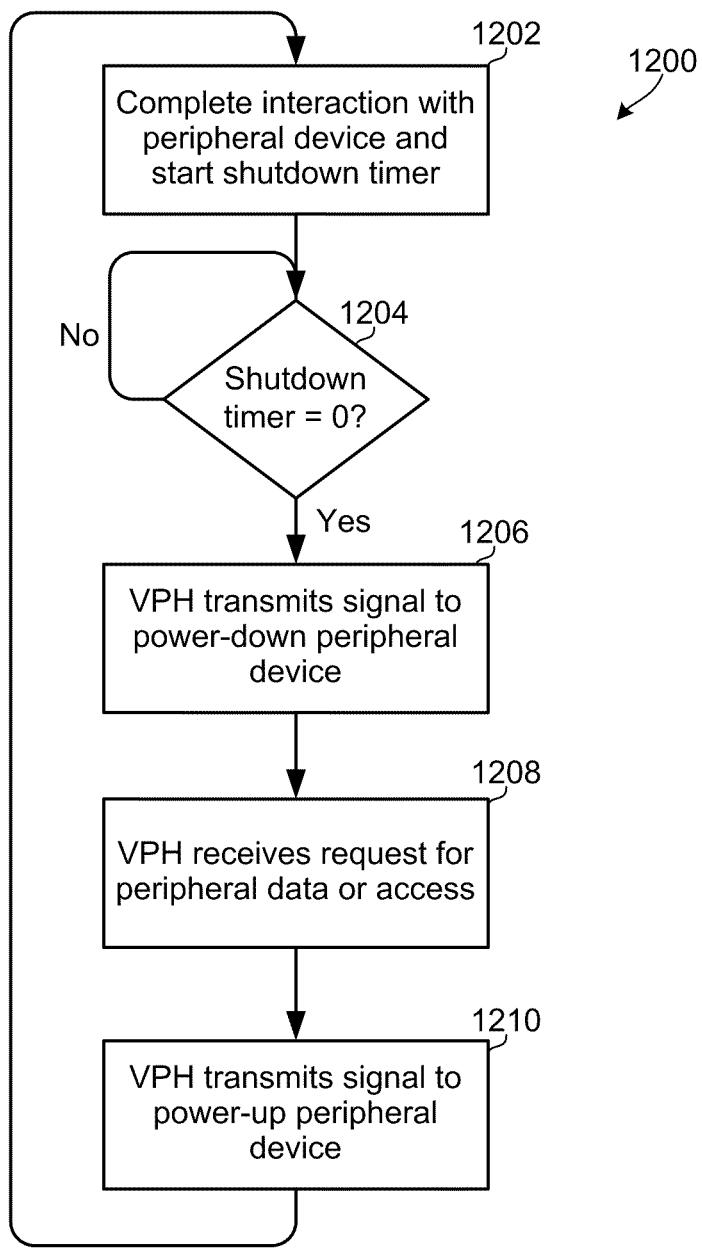
FIG. 12 is a process flow diagram of an embodiment method for activating and deactivating peripheral devices from the virtual peripheral hub device.

Another service enabled by the virtual peripheral hub device 112 is the ability to power up peripheral devices only when accessed. An example method 1200 for enabling this is illustrated in FIG. 12. The virtual peripheral hub device 112 may be configured with an idle shutdown timer that may be activated when an interaction with a particular peripheral device has been completed, step 1202. The virtual peripheral hub device processor 301 may monitor the shutdown timer to determine if it has expired, determination 1204. If another interaction with that peripheral device is accomplished before the countdown timer has expired the countdown timer may be restarted by returning to step 1202. If the countdown timer expires (i.e., determination 1204="Yes"), the processor may transmit a signal to the peripheral device commanding it to power down, step 1206. Powering down the peripheral device may allow it to conserve battery power or device lifetime while not in use. When the virtual peripheral hub device 112 receives a request for data from or an access to that peripheral device, step 1208, the virtual peripheral hub device 112 may transmit a signal to that peripheral device commanding it to power up, step 1210. Once the interaction with that peripheral device is completed, the shutdown timer may be restarted, returning to step 1202.

The virtual peripheral hub device 112 and the VPH services may enable a large number of server-based operations of potential value to consumers and businesses. Since the virtual peripheral hub device 112 provides simple access to a variety of peripheral devices without requiring installation of servers and Internet access routers, data from a wide range of electronic devices can be made available to establishments and businesses that can benefit from such data. One interesting concept that flows from the use of the intermediate VPH-server 140 is the concept of batched or server-initiated operations. Such services and operations could take the form of add-on services that can access the peripheral devices for context-sensitive operations. An example is security monitoring via webcams where the webcam 102 is "awakened" so that small clips or snapshots may be taken and transmitted to the VPH-server for later retrieval. Another example involves monitoring content sites and downloading specific content to mass storage. Another example includes batch uploads from connected, non-network-enabled devices, such as digital cameras. A further example is server-initiated uploads from automotive diagnostic systems.

Figure 13:
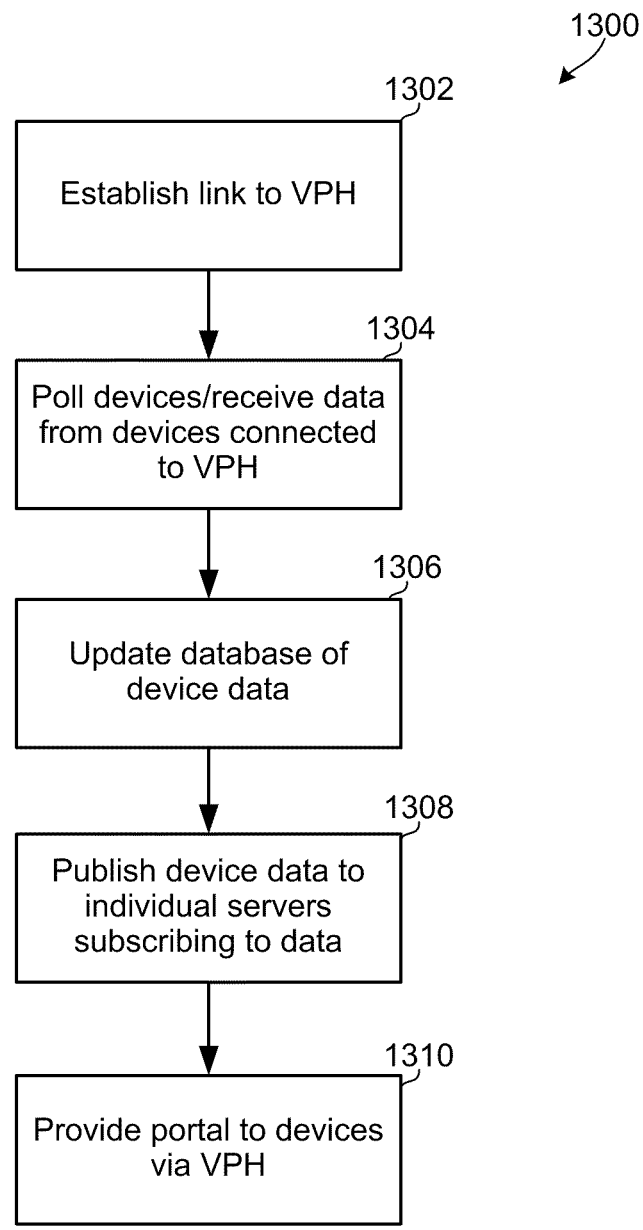
FIG. 13 is a process flow diagram of an embodiment method that may be implemented in a server for utilizing data obtained via a virtual peripheral hub device.

An example method 1300 which may be implemented by the VPH-server 140 to provide such server-based services is illustrated in FIG. 13. Periodically, the VPH-server 140 may establish a communication link to a virtual peripheral hub device 112 using the methods described above, step 1302. Once a communication link is established, the VPH-server 140 may send messages to the virtual peripheral hub device 112 to poll the connected peripheral devices and receive their data as described above, step 1304. The VPH-server 140 may then use the received device data to update a database, step 1306, and publish this database of device data to individual servers subscribing to the data, step 1308. Subscribers to the peripheral device data (e.g., security services companies, hospitals, device manufacturers, automobile maintenance companies, etc.) may subscribe to just the data that is of interest to them. Data subscribers may also have access to the peripheral devices if needed, as the VPH-server can function as a portal to peripheral devices via the registered virtual peripheral hub devices, step 1310.

The various embodiments enable a number of useful applications, some examples of which are described below.

The virtual peripheral hub device 112 and the VPH services can provide web access to a user's peripheral devices from any computer with Internet access. In such applications, the VPH-server 140 can act as the computer connected to the peripheral devices and provide access to the device data and commands via a web browser. For example, a peripheral device may be a remote hard drive 108 (e.g., a USB hard drive coupled to the virtual peripheral hub device 112 with a USB cable 6), in which case the VPH services would enable a user to browse and access content on the remote hard drive 108 from any web browser. Another example described above involves viewing images from webcams connected coupled to the virtual peripheral hub device 112. Another example concerns accessing the results of peripheral device operations conducted offline from any web browser. In a further example, the VPH-server 140 may be configured to host e-mail accounts where the actual data is stored on a remote hard drive 108 coupled to a virtual peripheral hub device 112. This application would allow users to maintain complete control over their personal email data while the e-mail service functions as if the e-mail message data were hosted on a server.

The VPH services may also be used to quickly enable remote access to mass storage devices. In this application, a mass storage device may be plugged into a virtual peripheral hub device 112 so that users may access the data stored on the storage device via the VPH-server 140. This application not only provides data security but also allows the users to share data across groups or access the data from any web browser.

Another VPH service described above involves providing remote vehicle diagnostics by plugging a virtual peripheral hub device 112 into the vehicle diagnostic port via a special USB cable. A virtual peripheral hub device 112 connected to this USB cable would allow remote and active diagnosis and monitoring of vehicles with no further investment in infrastructure or electronics since the VPH services utilize the infrastructure of cellular telephone networks and the Internet. As mentioned above, such services could extend to providing emergency communication services.

Another VPH service could provision X10 home control systems for consumers. The X10 protocol enables devices to communicate via the home electrical wiring and has been used for controlling household appliances, setting up security systems and the like. In this application, the virtual peripheral hub device 112 may be configured to communicate with other X10 system components, such as via the electrical wiring into which it is plugged, and relay configuration instructions received from the VPH-server 140 to the X10 components. This application may simplify the set up and configuration of such home control systems by relieving the user of the many of the tasks beyond plugging devices into electrical sockets.

In a further embodiment, the VPH and the VPH services may provide home automation and control capabilities without the need for a dedicated automation system. In this application, devices and household systems to be controlled may be plugged into the VPH, either directly or via wireless networks (e.g., BlueTooth®, WiFi, etc.), so their functions can be controlled by the VPH server or computers accessing the VPH server. For example, one of the VPH services could be home control capabilities, providing a server-hosted control system that users can configure by accessing the VPH server via a computer. Once the home automation/control settings are entered by a user, the VPH server may send commands via the VPH as needed to control the devices and household systems plugged into the VPH. In this manner, a low cost, highly configurable home automation system can be provided based around one or more VPH modules positioned within the home.

Figure 14:
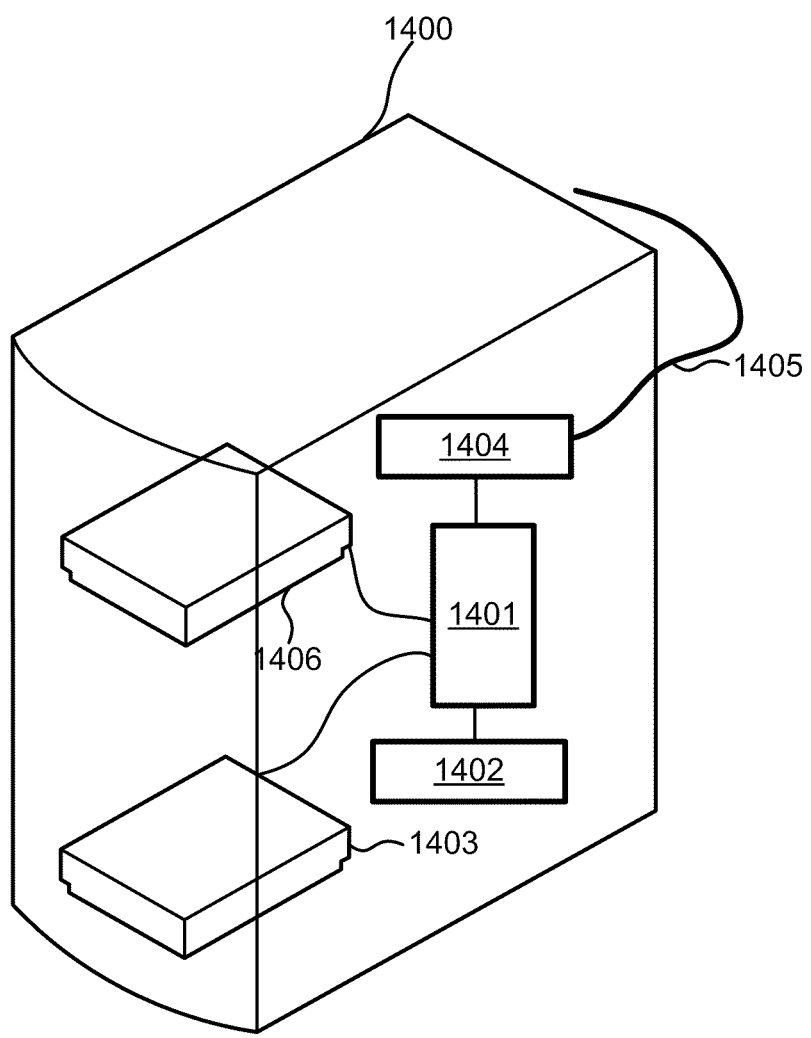
FIG. 14 is a component block diagram of a server suitable for use with various embodiments.

The embodiments described above may be implemented with any of a variety of server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive and/or a compact disc (CD) drive 1406 coupled to the processor 1401. The server 1400 may also include network access ports 1404 coupled to the processor 1401 for establishing data connections with network circuits 1405, such as the Internet.

While the various embodiments have been described with reference to a standalone virtual peripheral hub device 112, the VPH functionality may also be implemented in other communication devices equipped with a processor that can perform the VPH functionality and a transceiver for coupling to a wireless network, such as a cellular data network 130. For example, the VPH functionality may be implemented as an application running on a cellular telephone. Many cellular telephones include programmable processors that can be configured with a VPH functionality application, as well as multiple wireless transceivers that can be used to establish communication links with peripheral devices. Also, some cellular telephones include wired connection ports, such as USB or FireWire ports that can be coupled to peripheral devices. To implement the VPH functionality in a mobile device, for example, a VPH application may be implemented in the device processor which then performs the connection and communication functions described in the various embodiments.

Figure 15:
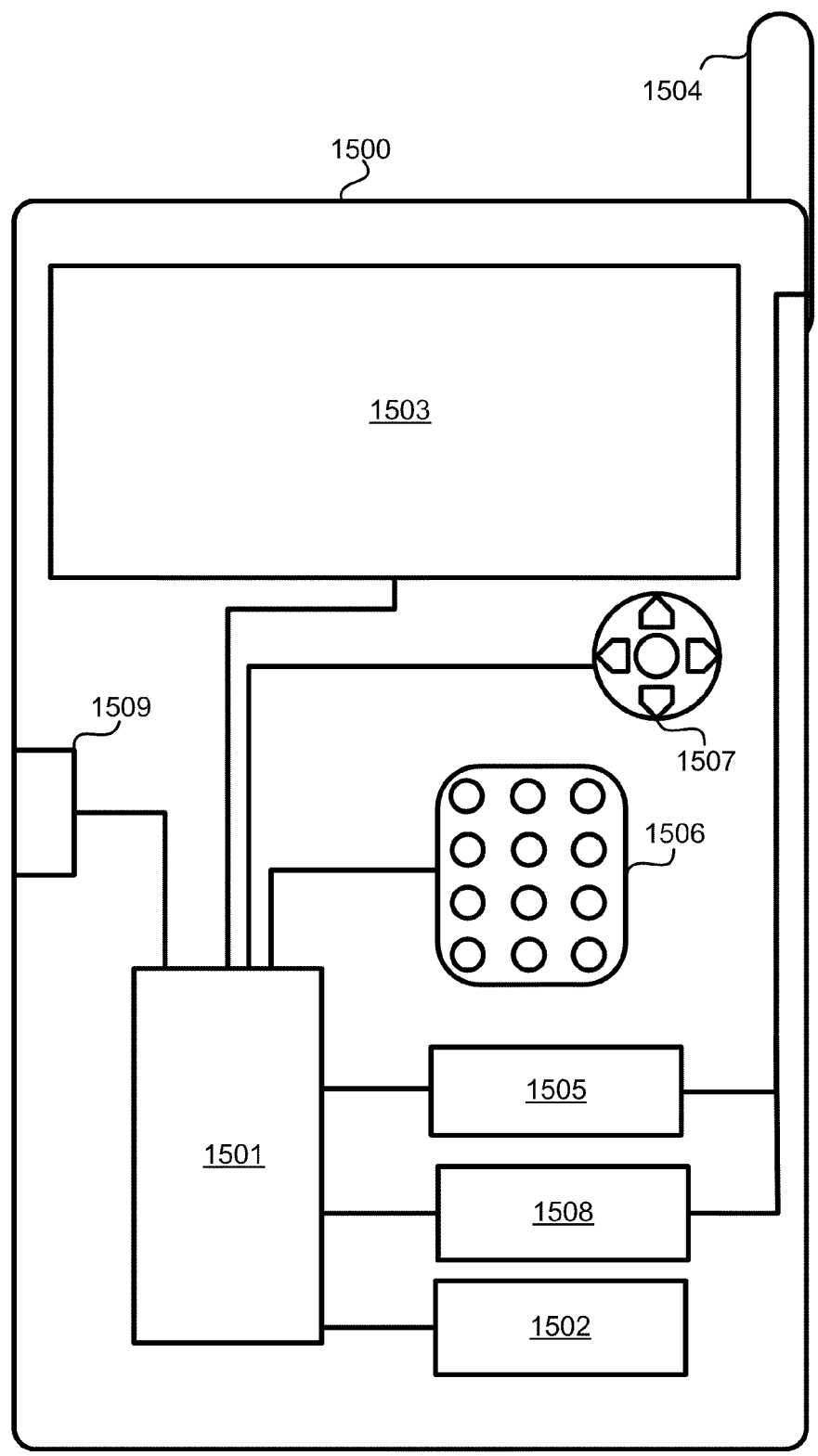
FIG. 15 is a component block diagram of a mobile device suitable for use with various embodiments.

A mobile device implementing the virtual peripheral hub functionality may have in common the components illustrated in FIG. 15. For example, an exemplary mobile device 1506 may include a processor 1501 coupled to internal memory 1502, and a display 1503. Additionally, the mobile device 1506 may have an antenna 1504 for sending and receiving electromagnetic radiation that is connected to a wireless data link and/or cellular telephone transceiver 1505 coupled to the processor 1501. The mobile device may also include a second transceiver 1508 for connecting to one or more local wireless networks, such as a Bluetooth transceiver for connecting to peripheral devices via blue tooth wireless connections and/or a WiFi transceiver for coupling to computers and peripheral devices via a local area wireless network. The mobile device may also include a USB (or FireWire) port 1509 for connecting to peripheral devices via a USB (or FireWire) cable. Mobile devices typically also include a key pad 1506 or miniature keyboard and menu selection buttons or rocker switches 1507 for receiving user inputs.

The processors 1501, 1401 in the various devices may be any programmable microprocessor, microcomputer or multiple processor chip or chips that can be configured by software instructions (applications) to perform a variety of functions, including the functions of the various embodiments described herein. In some devices, multiple processors 1501, 1401 may be provided, such as one processor dedicated to wireless communication functions and one processor dedicated to running other applications. Typically, software applications may be stored in the internal memory 1502, 1402 before they are accessed and loaded into the processor 1501, 1401. In some mobile devices, the processor 1501, 1401 may include internal memory sufficient to store the application software instructions. In some devices, the secure memory may be in a separate memory chip coupled to the processor 1501, 1401. In many devices the internal memory 1502, 1402 may be a volatile or nonvolatile memory, such as flash memory, or a mixture of both. For the purposes of this description, a general reference to memory refers to all memory accessible by the processor 1501, 1401, including internal memory 1502, 1402, removable memory plugged into the device, and memory within the processor 1501, 1401 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a non-transitory, tangible computer-readable storage medium. Non-transitory computer-readable media include any available computer storage media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing access to a peripheral device, comprising:
  accessing a remote server from a communication device via a first wireless network;

upon accessing the remote server, providing a unique identifier associated with the communication device from the communication device to the remote server;
generating a secure communication driver specific to the communication device at the remote server in response to receiving the unique identifier;
sending the secure communication driver to a personal computer;
subsequent to provision of the unique identifier, coupling the peripheral device to the communication device;
identifying the peripheral device to the remote server from the communication device;
associating the peripheral device with the communication device in a data store in the remote server;
receiving peripheral device data from the peripheral device in the communication device; and
transmitting the peripheral device data to the remote server from the communication device.

2. The method of claim 1, further comprising establishing a second wireless communication link between the peripheral device and the communication device,
wherein coupling the peripheral device to the communication device and receiving peripheral device data from the peripheral device in the communication device are accomplished via the established second wireless communication link.

3. The method of claim 1, further comprising:
accessing the remote server from the personal computer via an Internet; and
receiving the peripheral device data in the personal computer from the remote server via the Internet using the secure communication driver.

4. The method of claim 1, wherein the first wireless network is a cellular data network, the method further comprising:
placing a data call to the remote server from the communication device via the cellular data network;
indicating on the communication device when a communication link is established between the communication device and the remote server;
accessing the remote server from the personal computer via an Internet;
transmitting a user identifier and a code printed on the communication device to the remote server from the personal computer via the Internet;
determining at the remote server whether the transmitted code matches the unique identifier provided by the communication device; and
associating the communication device with the user identifier if it is determined that the transmitted code matches the unique identifier provided by the communication device.

5. The method of claim 4, further comprising:
assigning an IPv6 address to the peripheral device; and
informing a web browser of the peripheral device IPv6 address.

6. The method of claim 4, further comprising:
downloading an appropriate driver for the coupled peripheral device to the personal computer if it is determined that the transmitted code matches the unique identifier provided by the communication device.

7. The method of claim 1, further comprising:
transmitting the peripheral device data from the communication device to the remote server as encapsulated internet protocol (IP) packets via an Internet;
receiving the encapsulated IP packets at the remote server;
unpacking the encapsulated IP packets to obtain the peripheral device data; and
processing the peripheral device data in the remote server using a driver appropriate for the peripheral device.

8. The method of claim 1, further comprising:
transmitting the processed peripheral device data to another server via the Internet.

9. The method of claim 1, further comprising:
discovering peripheral devices coupled to the communication device; and
identifying each discovered peripheral device to the remote server.

10. The method of claim 1, wherein:
the first wireless network is a cellular telephone network,
the method further comprises transmitting a message from the remote server to the communication device via the cellular telephone network,
accessing the remote server from a communication device via a first wireless network is accomplished in response to receiving the message via the cellular telephone network.

11. The method of claim 10, wherein the transmitted message is a simple message service (SMS) message.

12. The method of claim 11, further comprising:
receiving the SMS message in the communication device; and
determining whether the SMS message indicates that the communication device should activate,
wherein accessing the remote server from a communication device via a first wireless network is accomplished in response to determining that the SMS message indicates that the communication device should activate.

13. The method of claim 1, further comprising:
transmitting the peripheral device data from the communication device to the remote server as encapsulated internet protocol (IF) packets via an Internet;
receiving the encapsulated IP packets at the remote server;
forwarding the encapsulated IP packets from the remote server to a second server via the Internet;
unpacking the encapsulated IP packets at the second server to obtain the peripheral device data; and
processing the peripheral device data in the second server using a driver appropriate for the peripheral device.

14. The method of claim 1, further comprising:
determining whether a predetermined time has expired since the peripheral device was last accessed; and
sending a signal to the peripheral device commanding it to power down when the predetermined time has expired.

15. The method of claim 1, further comprising:
transmitting a request for data of the peripheral device from the remote server to the communication device; and
sending a request for data to the peripheral device in response to receiving the request for data of the peripheral device in the communication device.

16. The method of claim 15, further comprising:
determining whether the peripheral device is powered down in response to receiving the request for data of the peripheral device in the communication device; and
sending a signal to the peripheral device commanding it to power up if it is determined that the peripheral device is powered down.

17. The method of claim 1, further comprising:
determining a global location of the communication device from a global positioning system (GPS) sensor within the communication device;
transmitting the GPS location information from the communication device to the remote server;

determining a user identity in the remote server based on the GPS location information; and
associating the communication device with the determined user identity.

18. The method of claim 1, further comprising:
determining in the communication device whether a change has occurred in received peripheral device data;
establishing a communication link with the remote server via the first wireless network when the communication device determines that a change has occurred in received peripheral device data; and
transmitting the changed peripheral device data to the remote server from the communication device.

19. The method of claim 1, wherein:
the peripheral device is a household system; and
the remote server is configured to provide control signals to the household system via the communication device.

20. The method of claim 3, further comprising:
authenticating one or more of the personal computer, a user of the personal computer, the communication device and the peripheral device prior to providing the peripheral device data to the personal computer.

21. The method of claim 1, further comprising encrypting the peripheral device data transmitted to the remote server by the communication device.

22. The method of claim 3, further comprising encrypting the peripheral device data transmitted to the personal computer.

23. The method of claim 1, wherein:
the peripheral device is a data storage device configured to store user data;
the method further comprises receiving in the communication device a request for user data from the remote server;
receiving peripheral device data from the peripheral device in the communication device comprises accessing user data from the data storage device based upon the received request for user data; and
transmitting the peripheral device data to the remote server from the communication device comprises transmitting the user data accessed from the data storage device to the remote server.

24. A communication system, comprising:
a server coupled to an Internet, comprising a data store and a server-processor coupled to the data store; and
a communication device, comprising:
a processor;
a first wireless transceiver coupled to the processor and configured to communicate via a first wireless network; and
a local network connection circuit coupled to the processor and configured to enable a data communication link with a peripheral device,
wherein the processor is configured with processor-executable instructions to perform operations comprising:
accessing the server via the first wireless network;
upon accessing the remote server, providing a unique identifier associated with the communication device to the server;
subsequent to provision of the unique identifier, identifying to the server a peripheral device connected to the wired network connection socket;
receiving peripheral device data from the peripheral device; and
transmitting the peripheral device data to the server, and
wherein the server-processor is configured with server-executable instructions to perform operations comprising:
communicating with the communication device via the Internet;
associating the peripheral device with the communication device in a data store in the server;
generating a secure communication driver specific to the communication device at the remote server in response to receiving the unique identifier; and
sending the secure communication driver to a personal computer.

25. The communication system of claim 24, wherein the local network connection circuit comprises a second wireless transceiver configured to establish a second wireless communication link between the processor and the peripheral device,
wherein the processor is configured with processor-executable instructions to perform operations such that receiving peripheral device data from the peripheral device comprises receiving the peripheral device data via the second wireless communication link.

26. The communication system of claim 24, wherein the server-processor is configured with server-executable instructions to perform operations further comprising:
communicating with the personal computer via the Internet; and
transmitting the peripheral device data to the personal computer via the Internet using the secure communication driver.

27. The communication system of claim 24, wherein:
the first wireless network is a cellular data network;
the processor is configured with processor-executable instructions to perform operations further comprising:
placing a data call to the server via the cellular data network; and
indicating on the communication device when a communication link is established between the communication device and the server; and
the server-processor is configured with server-executable instructions to perform operations further comprising:
receiving an access inquiry from the personal computer via the Internet;
receiving a user identifier and a code printed on the communication device from the personal computer via the Internet;
determining whether the transmitted code matches the unique identifier provided by the communication device; and
associating the communication device with the user identifier if it is determined that the transmitted code matches the unique identifier provided by the communication device.

28. The communication system of claim 27, wherein the server processor is configured with server-executable instructions to perform operations further comprising:
assigning an IPv6 address to the peripheral device; and
informing a web browser on the personal computer of the peripheral device IPv6 address.

29. The communication system of claim 27, wherein the server-processor is configured with server-executable instructions to perform operations further comprising:
downloading an appropriate driver for the coupled peripheral device to the personal computer if it is determined that the transmitted code matches the unique identifier provided by the communication device.

30. The communication system of claim 24, wherein:
the processor is configured with processor-executable instructions to perform operations further comprising:
transmitting the peripheral device data to the server as encapsulated internet protocol (IP) packets via the Internet; and
the server-processor is configured with server-executable instructions to perform operations further comprising:
receiving the encapsulated IP packets;
unpacking the encapsulated IP packets to obtain the peripheral device data; and
processing the peripheral device data using a driver appropriate for the peripheral device.

31. The communication system of claim 30, wherein the server-processor is configured with server-executable instructions to perform operations further comprising:
transmitting the processed peripheral device data to another server via the Internet.

32. The communication system of claim 24, wherein:
the communication device comprises a plurality of wired network connection sockets coupled to the processor and configured to enable data communication links with a plurality of peripheral devices; and
the processor is configured with processor-executable instructions to perform operations further comprising:
discovering peripheral devices coupled to one or more of the plurality of wired network connection sockets; and
identifying each discovered peripheral device to the server.

33. The communication system of claim 24, wherein:
the first wireless network is a cellular telephone network,
the processor is configured with processor-executable instructions to perform operations further comprising transmitting a message from the server to the communication device via the cellular telephone network,
the processor is configured with processor-executable instructions to perform operations such that accessing the server from a communication device via a first wireless network is accomplished in response to receiving the message via the cellular telephone network.

34. The communication system of claim 33, wherein the server-processor is configured with server-executable instructions to perform operations such that the transmitted message is a simple message service (SMS) message.

35. The communication system of claim 34, wherein the processor is configured with processor-executable instructions to perform operations further comprising:
receiving the SMS message; and
determining whether the SMS message indicates that the communication device should activate, and
wherein the processor is configured with processor-executable instructions to perform operations further comprising such that accessing the server via a first wireless network is accomplished in response to determining that the SMS message indicates that the communication device should activate.

36. The communication system of claim 24, further comprising a second server coupled to the Internet, wherein:
the processor is configured with processor-executable instructions to perform operations further comprising transmitting the peripheral device data from the communication device to the server as encapsulated internet protocol (IF) packets via an Internet;
the server-processor is configured with server-executable instructions to perform operations further comprising:
receiving the encapsulated IP packets; and
forwarding the encapsulated IP packets from the server to the second server via the Internet;
the second server is configured with processor-executable instructions to perform operations comprising:
unpacking the encapsulated IP packets at the second server to obtain the peripheral device data; and
processing the peripheral device data in the second server using a driver appropriate for the peripheral device.

37. The communication system of claim 24, wherein the processor is configured with processor-executable instructions to perform operations further comprising:
determining whether a predetermined time has expired since the peripheral device was last accessed; and
sending a signal to the peripheral device commanding it to power down when the predetermined time has expired.

38. The communication system of claim 24, wherein:
the server-processor is configured with server-executable instructions to perform operations further comprising transmitting a request for data of the peripheral device to the communication device; and
the processor is configured with processor-executable instructions to perform operations further comprising sending a request for data to the peripheral device in response to receiving the request for data of the peripheral device from the server.

39. The communication system of claim 38, wherein the server-processor is configured with server-executable instructions to perform operations further comprising:
determining whether the peripheral device is powered down in response to receiving the request for data of the peripheral device; and
sending a signal to the peripheral device commanding it to power up if it is determined that the peripheral device is powered down.

40. The communication system of claim 24, wherein:
the processor is configured with processor-executable instructions to perform operations further comprising further comprising:
determining a global location of the communication device from a global positioning system (GPS) sensor within the communication device; and
transmitting the GPS location information from the communication device to the server; and
the server-processor is configured with server-executable instructions to perform operations further comprising:
determining a user identity in the server based on the GPS location information; and
associating the communication device with the determined user identity.

41. The communication system of claim 24, wherein the processor is configured with processor-executable instructions to perform operations further comprising:
determining whether a change has occurred in received peripheral device data;
establishing a communication link with the server via the first wireless network when the communication device determines that a change has occurred in received peripheral device data; and
transmitting the changed peripheral device data to the server.

42. The communication system of claim 24, wherein:
the peripheral device is a household system; and
the server-processor is configured with server-executable instructions to perform operations further comprising providing control signals to the household system via the communication device.

43. The communication system of claim 26, wherein the server-processor is configured with server-executable instructions to perform operations further comprising:
    authenticating one or more of the personal computer, a user of the personal computer, the communication device and the peripheral device prior to providing the peripheral device data to the personal computer.

44. The communication system of claim 24, wherein the processor is configured with processor-executable instructions to perform operations further comprising encrypting the peripheral device data transmitted to the server.

45. The communication system of claim 26, wherein the server-processor is configured with server-executable instructions to perform operations further comprising encrypting the peripheral device data transmitted to the personal computer.

46. The communication system of claim 24, wherein:
    the peripheral device is a data storage device configured to store user data;
    the processor is configured with processor-executable instructions to perform operations further comprising receiving a request for user data from the server;
    the processor is configured with processor-executable instructions to perform operations such that receiving peripheral device data from the peripheral device comprises accessing user data from the data storage device based upon the received request for user data; and
    the processor is configured with processor-executable instructions to perform operations such that transmitting the peripheral device data to the server comprises transmitting the user data accessed from the data storage device to the server.

47. A communication system, comprising:
    means for accessing a server from a communication device via a first wireless network;
    means for providing a unique identifier associated with the communication device from the communication device to the server upon accessing the server;
    means for coupling a peripheral device to the communication device subsequent to providing the unique identifier;
    means for generating a secure communication driver specific to the communication device at the server in response to receiving the unique identifier;
    means for sending the secure communication driver to a personal computer;
    means for identifying the peripheral device to the server from the communication device;
    means for associating the peripheral device with the communication device in a data store in the server;
    means for receiving peripheral device data from the peripheral device in the communication device; and
    means for transmitting the peripheral device data to the server from the communication device.

48. The communication system of claim 47, wherein:
    means for coupling a peripheral device to the communication device comprises means for establishing a second wireless communication link between the peripheral device and the communication device; and
    means for receiving peripheral device data from the peripheral device in the communication device comprises means for receiving the peripheral device data via the second wireless communication link.

49. The communication system of claim 47, further comprising:
    means for accessing the server from the personal computer via an Internet; and
    means for receiving the peripheral device data in the personal computer from the server via the Internet using the secure communication driver.

50. The communication system of claim 47, wherein the first wireless network is a cellular data network, the communication device further comprising:
    means for placing a data call to the server from the communication device via the cellular data network;
    means for indicating on the communication device when a communication link is established between the communication device and the server;
    means for accessing the server from the personal computer via an Internet;
    means for transmitting a user identifier and a code printed on the communication device to the server from the personal computer via the Internet;
    means for determining at the server whether the transmitted code matches the unique identifier provided by the communication device; and
    means for associating the communication device with the user identifier if it is determined that the transmitted code matches the unique identifier provided by the communication device.

51. The communication system of claim 50, further comprising:
    means for assigning an IPv6 address to the peripheral device; and
    means for informing a web browser of the peripheral device IPv6 address.

52. The communication system of claim 50, further comprising:
    means for downloading an appropriate driver for the coupled peripheral device to the personal computer if it is determined that the transmitted code matches the unique identifier provided by the communication device.

53. The communication system of claim 47, further comprising:
    means for transmitting the peripheral device data from the communication device to the server as encapsulated internet protocol (IF) packets via an Internet;
    means for receiving the encapsulated IP packets at the server;
    means for unpacking the encapsulated IP packets to obtain the peripheral device data; and
    means for processing the peripheral device data in the server using a driver appropriate for the peripheral device.

54. The communication system of claim 53, further comprising:
    means for transmitting the processed peripheral device data to another server via the Internet.

55. The communication system of claim 47, further comprising:
    means for discovering peripheral devices coupled to the communication device; and
    means for identifying each discovered peripheral device to the server.

56. The communication system of claim 47, wherein:
    the first wireless network is a cellular telephone network,
    the communication device further comprises means for transmitting a message from the server to the communication device via the cellular telephone network,
    means for accessing the server from a communication device via a first wireless network comprises means for accessing the server from a communication device via a first wireless network in response to receiving the message via the cellular telephone network.

57. The communication system of claim 56, wherein the transmitted message is a simple message service (SMS) message.

58. The communication system of claim 57, further comprising:
means for receiving the SMS message in the communication device; and
means for determining whether the SMS message indicates that the communication device should activate,
wherein means for accessing the server from a communication device via a first wireless network comprises means for accessing the server from a communication device via a first wireless network in response to determining that the SMS message indicates that the communication device should activate.

59. The communication system of claim 47, further comprising:
means for transmitting the peripheral device data from the communication device to the server as encapsulated internet protocol (IF) packets via an Internet;
means for receiving the encapsulated IP packets at the server;
means for forwarding the encapsulated IP packets from the server to a second server via the Internet;
means for unpacking the encapsulated IP packets at the second server to obtain the peripheral device data; and
means for processing the peripheral device data in the second server using a driver appropriate for the peripheral device.

60. The communication system of claim 47, further comprising:
means for determining whether a predetermined time has expired since the peripheral device was last accessed; and
means for sending a signal to the peripheral device commanding it to power down when the predetermined time has expired.

61. The communication system of claim 47, further comprising:
means for transmitting a request for data of the peripheral device from the server to the communication device; and
means for sending a request for data to the peripheral device in response to receiving the request for data of the peripheral device in the communication device.

62. The communication system of claim 60, further comprising:
means for determining whether the peripheral device is powered down in response to receiving the request for data of the peripheral device in the communication device; and
means for sending a signal to the peripheral device commanding it to power up if it is determined that the peripheral device is powered down.

63. The communication system of claim 47, further comprising:
means for determining a global location of the communication device from a global positioning system (GPS) sensor within the communication device;
means for transmitting the GPS location information from the communication device to the server;
means for determining a user identity in the server based on the GPS location information; and
means for associating the communication device with the determined user identity.

64. The communication system of claim 47, further comprising:
means for determining in the communication device whether a change has occurred in received peripheral device data;
means for establishing a communication link with the server via the first wireless network when the communication device determines that a change has occurred in received peripheral device data; and
means for transmitting the changed peripheral device data to the server from the communication device.

65. The communication system of claim 47, wherein:
the peripheral device is a household system; and
the server is configured to provide control signals to the household system via the communication device.

66. The communication system of claim 49, further comprising:
means for authenticating one or more of the personal computer, a user of the personal computer, the communication device and the peripheral device prior to providing the peripheral device data to the personal computer.

67. The communication system of claim 47, further comprising means for encrypting the peripheral device data transmitted to the server by the communication device.

68. The communication system of claim 49, further comprising means for encrypting the peripheral device data transmitted to the personal computer.

69. The communication system of claim 47, wherein:
the peripheral device is a data storage device configured to store user data;
the communication device further comprises means for receiving in the communication device a request for user data from the server;
means for receiving peripheral device data from the peripheral device in the communication device comprises means for accessing user data from the data storage device based upon the received request for user data; and
means for transmitting the peripheral device data to the server from the communication device comprises means for transmitting the user data accessed from the data storage device to the server.

70. A communication device, comprising:
means for accessing a server via a first wireless network;
means for providing a unique identifier associated with the communication device from the communication device to the server upon accessing the server, wherein the server is configured to generate a secure communication driver specific to the communication device in response to receiving the unique identifier and send the secure communication driver to a personal computer;
means for coupling a peripheral device to the communication device subsequent to providing the unique identifier;
means for identifying the peripheral device to the server;
means for receiving peripheral device data from the peripheral device; and
means for transmitting the peripheral device data to the server.

71. The communication system of claim 70, wherein:
means for coupling a peripheral device to the communication device comprises means for establishing a second wireless communication link between the peripheral device and the communication device; and
means for receiving peripheral device data from the peripheral device comprises means for receiving the peripheral device data via the second wireless communication link.

72. The communication device of claim 70, further comprising:
means for wirelessly communicating data between the communication device and one or more peripheral devices.

73. The communication device of claim 70, wherein means for accessing a server via a first wireless network comprises means for accessing a server via a cellular data network, the communication device further comprising:
means for placing a data call to the server via the cellular data network; and
means for indicating when a communication link is established between the communication device and the server.

74. The communication device of claim 70, further comprising:
means for transmitting the peripheral device data to the server as encapsulated Internet protocol (IP) packets via an Internet.

75. The communication device of claim 70, further comprising:
means for establishing data communication links with a plurality of peripheral devices;
means for discovering peripheral devices coupled to the communication device; and
means for identifying each discovered peripheral device to the server.

76. The communication device of claim 70, wherein:
means for accessing a server via a first wireless network comprises means for accessing a server via a cellular data network,
the communication device further comprises means for receiving a message from the server via the cellular telephone network; and
means for accessing the server from a communication device via a first wireless network comprises means for accessing the server from a communication device via a first wireless network in response to receiving the message via the cellular telephone network.

77. The communication device of claim 76, wherein the transmitted message is a simple message service (SMS) message.

78. The communication device of claim 77, further comprising:
means for receiving the SMS message; and
means for determining whether the SMS message indicates that the communication device should activate,
wherein means for accessing the server via a first wireless network comprises means for accessing the server via a first wireless network in response to determining that the SMS message indicates that the communication device should activate.

79. The communication device of claim 70, further comprising:
means for determining whether a predetermined time has expired since the peripheral device was last accessed; and
means for sending a signal to the peripheral device commanding it to power down when the predetermined time has expired.

80. The communication device of claim 70, further comprising:
means for receiving a request for data of the peripheral device from the server; and
means for sending a request for data to the peripheral device in response to receiving the request for data of the peripheral device from the server.

81. The communication device of claim 80, further comprising:
means for determining whether the peripheral device is powered down in response to receiving the request for data of the peripheral device from the server; and
means for sending a signal to the peripheral device commanding it to power up if it is determined that the peripheral device is powered down.

82. The communication device of claim 70, further comprising:
means for determining a global positioning system (GPS) location of the communication device; and
means for transmitting the GPS location information to the server.

83. The communication device of claim 70, further comprising:
means for determining whether a change has occurred in received peripheral device data;
means for establishing a communication link with the server via the first wireless network when it is determined that a change has occurred in received peripheral device data; and
means for transmitting the changed peripheral device data to the server.

84. The communication device of claim 70, further comprising means for providing authenticating information to the server to enable authenticating one or both of the communication device and the peripheral device to the server.

85. The communication device of claim 70, further comprising means for encrypting the peripheral device data transmitted to the server by the communication device.

86. The communication device of claim 70, wherein:
the peripheral device is a data storage device configured to store user data;
the communication device further comprises means for receiving in the communication device a request for user data from the server;
means for receiving peripheral device data from the peripheral device in the communication device comprises means for accessing user data from the data storage device based upon the received request for user data; and
means for transmitting the peripheral device data to the server from the communication device comprises means for transmitting the user data accessed from the data storage device to the server.

* * * * *